United States Patent [19]

Robertson

[11] Patent Number: 5,608,850

[45] Date of Patent: Mar. 4, 1997

[54] TRANSPORTING A DISPLAY OBJECT COUPLED TO A VIEWPOINT WITHIN OR BETWEEN NAVIGABLE WORKSPACES

[75] Inventor: George G. Robertson, Foster City, Calif.

[73] Assignee: Xerox Corporation, Stamford, Conn.

[21] Appl. No.: 227,762

[22] Filed: Apr. 14, 1994

[51] Int. Cl.$^6$ ................................................. G06F 15/00
[52] U.S. Cl. ............................................. 395/127; 395/355
[58] Field of Search ......................... 395/118–121, 127, 395/133, 134, 155, 157, 158, 160, 161

[56] References Cited

U.S. PATENT DOCUMENTS

| 5,050,105 | 9/1991 | Peters | 345/119 |
| 5,107,443 | 4/1992 | Smith et al. | 395/158 |
| 5,230,063 | 7/1993 | Hoeber et al. | 395/156 |
| 5,233,687 | 8/1993 | Henderson, Jr. et al. | 395/158 |
| 5,276,785 | 1/1994 | Mackinlay et al. | 395/127 |
| 5,359,703 | 10/1994 | Robertson et al. | 395/119 |

(List continued on next page.)

OTHER PUBLICATIONS

Fitzmaurice, "Situated information spaces and spatially aware palmtop computers", Comm. of the ACM, v. 36, n. 7, pp. 39–49 Jul. 1993.
Robertson, Card and Mackinlay in "Information Visualization Using 3D Interactive Animation", Communications ACM, 36, 4, Apr. 1993, pp. 57–71.

(List continued on next page.)

*Primary Examiner*—Heather R. Herndon
*Assistant Examiner*—Joseph R. Burwell
*Attorney, Agent, or Firm*—Judith C. Bares

[57] ABSTRACT

A method and processor-controlled system are disclosed for transporting a selected display object, presented in a graphical image of an n-dimensional, navigable workspace where the selected display object is perceptible as viewed from one of a plurality of viewpoints in the workspace, by coupling the selected display object to a first viewpoint of the workspace. A display object perceptible as viewed from a first viewpoint and selected for transport is coupled to the first viewpoint so that the display object appears to maintain the same relative position to the first viewpoint as the system user changes viewpoints in the workspace, while other display objects in the workspace are perceptible as viewed from the changed viewpoints. This results in the selected display object always being perceptible in the workspace even if the selected display object would not have been perceptible from one of the changed viewpoints in the workspace. In addition, several selected display objects are always perceptible in their original relationship to each other and to the first viewpoint while being transported. The display object coupling technique is useful in large 2D or 3D visualization workspaces, for example to move or copy display objects to portions of the workspace that are presently not perceptible, and to move or copy display objects from a first workspace perceptible on the display to a second workspace presently not perceptible on the display. An implementation of the transport technique in a multiple workspace, 3D information visualization environment is described.

38 Claims, 18 Drawing Sheets

U.S. PATENT DOCUMENTS

| | | | |
|---|---|---|---|
| 5,367,623 | 11/1994 | Iwai et al. | 395/157 |
| 5,404,442 | 4/1995 | Foster et al. | 395/159 |
| 5,422,993 | 6/1995 | Fleming | 395/159 |
| 5,513,303 | 4/1996 | Robertson et al. | 395/119 |

OTHER PUBLICATIONS

Card., S., Robertson, G, and Mackinlay, J., "The Information Visualizer, An Information Workspace," Proceedings of SIGCHI '91, 1991, pp. 181–188.

Mackinlay, J. Card., S., and Robertson, G. "Rapid Controlled Movement Through a Virtual 3D Workspace,", Proceedings of SIGGRAPH '90, Aug. 1990, pp. 171–176.

Perlin, K. and Fox, D., "Pad: An Alternative Approach to the Computer Interface," Computer Graphics Proceedings of SIGGRAPH '93, Anaheim, CA, Aug. 1–6, 1993, pp. 57–64.

Robertson, G., "The Document Lens," Proceedings of UIST '93, Nov. 1993, pp. 101–108.

Smith, D. C., et al, "Designing the Star User Interface", BYTE, vol. 7, No. 4 (Apr. 1982), pp. 242–282.

MacPaint Manual, Apple Computer, date unknown, page number unknown.

Heid, J. and Norton, P., Inside the Apple Macintosh, New York, 1989, pp. 71.

Fisher, S. S., et al., "Virtual Environment Display System", ACM Workshop on Interactive 3D Graphics, Chapel Hill, North Carolina, Oct. 1986, pp. 1–11.

Herot, C. F. "Spatial Management of Data", ACM Trans. on Database Systems, vol. 5, No. 4 (Dec. 1980), pp. 493–514.

Bolt, R. A., *The Human Interface,* Lifetime Learning Publications, Belmont, California, 1984 pp. 8–34.

Henderson, D. A. and Card, S. K., "Rooms: The use of multiple virtual workspaces to reduce space contention in a window–based graphical user interface", *ACM Transactions on Graphics,* Jul. 1986, pp. 211–243.

Smith, Randall B., "The Alternate Reality Kit: An Animated Environmental for Creating Interactive Simulations" in *IEEE Computer Society Workshop on Visual Languages,* Jun., 1986 at pp. 99–106.

TRANSPORTING A DISPLAY OBJECT COUPLED TO A VIEWPOINT WITHIN OR BETWEEN NAVIGABLE WORKSPACES

This application is related to co-pending U.S. application Ser. No. 08/227,763.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND

The present invention relates to an interactive user interface method of transporting a display object within a single or from one to another, n-dimensional workspace of a processor-controlled system, wherein the display object remains coupled to a first viewpoint while being transported.

Processor-based systems such as personal computers and workstation systems that are used to assist a single user or multiple users in retrieving, storing, manipulating and understanding large amounts of information require innovative user interfaces that result in lowering the transaction costs of finding and accessing information. Display based, graphical user interfaces (GUIs) have been used to provide the perception to the system user of having a workspace in which to manipulate information. One type of graphical user interface (GUI) employs a two-dimensional (2D) desktop metaphor where information is presented in a single large 2D display region bounded by the physical size of the display area of the display device that serves as the metaphorical desktop and that may include other 2D display regions, called windows, the opening, closing, and manipulation of which are controlled by the system user. The system user interacts with—that is, performs operations on—displayed 2D graphical objects, such as icons, menus, and dialog boxes, using a pointing device. The graphical desktop may be considered to be the system user's workspace, and is constrained by the physical size of the particular display area, or screen, being used. All of the information associated with a particular window may not be able to be displayed in the window at one time, and is typically accessible via a scrolling mechanism.

A common interaction technique provided by the single workspace, 2D desktop GUI is that of moving or copying display objects to another position in the workspace, or from one window to another. Common techniques for selecting, moving and copying (collectively referred to herein as "transporting") data, information or objects in a conventional 2D GUI are well-known. One technique uses a "drag-and-drop" metaphor in which the system user selects a display object such as an icon using the pointing device by depressing a button on the device. The system attaches the icon to the cursor under the control of the pointing device as long as the user continues to depress the button; the user then uses the pointing device to drag the cursor across the display, simulating motion of the selected object to a new position perceptible in the display area, positioning the object in its destination position by releasing the button on the pointing device. This technique is provided, and works effectively, when the entire 2D workspace, including the display object being transported and the destination position, are always perceptible and there is, therefore, only one fixed viewpoint from which the 2D workspace is viewed by the system user. This technique is typically not provided for transporting objects within a window in the workspace to a destination position that is not perceptible at the time that the display object is selected for transporting.

Another common technique used for selecting and transporting data, information or objects in a conventional 2D GUI is called "cut-and-paste" and employs a memory location, typically called a "clipboard", to store the data being transported while the system user finds the destination position in the 2D workspace. This technique is provided, and works effectively, when the destination position in the 2D workspace is not perceptible to the system user. For example, in a window that contains display objects representing the text of a document, only the portion of the document that fits in the window region is perceptible at any one time. There is typically provided a scrolling mechanism for bringing a new portion of the document into view in place of the currently displayed portion. In this environment, in order to move a text display object from one portion of the document to another, the user typically selects the text display object with the pointing device, executes a "cut" command, and the data representing the selected text display object is stored on the clipboard (i.e., in the clipboard memory location) and the display object may be removed from the window and may no longer be perceptible to the user. The user then scrolls to bring a new portion of the document into view that includes the intended destination of the data in the document, selects the destination position, and executes a "paste" command. Alternatively, the user could designate a destination position in a second window. The data representing the selected text display object is then retrieved from the memory location and presented in the destination position. During the move operation, the display object being transported is not perceptible to the user because it is removed from the window at the time it is cut, and during a copy operation, the display object being transported is not perceptible to the user if the scrolling process removes the display object from view. Some systems provide a separate, user-activated function for viewing the contents of the clipboard in a separate window.

A variation of the cut-and-paste technique highlights the selected display object to be transported, and places the cursor in a special operation "mode" that allows the user to perform no other operations on display objects until the current operation has been completed. The user is permitted operations with the cursor that change the view of the information displayed, such as scrolling in a window, in order to find the destination position. The display object being operated on is not perceptible to the user if the scrolling process removes it from view, and it moves in the window as the document is being scrolled so as to remain in a position relative to its neighboring display objects.

Some GUIs attempt to provide the user with the perception that his or her immediate workspace is larger than is actually displayed in the display area. For example, the 2D desktop metaphor of the single workspace has been extended to multiple 2D desktop workspaces in a GUI called "Rooms" that permits a user to switch among workspaces, allowing more information to reside in the immediate work area. Rooms® is a registered trademark of Xerox Corporation. Henderson, D. A. and Card, S. K., "Rooms: The use of multiple virtual workspaces to reduce space contention in a window-based graphical user interface", ACM *Transactions on Graphics,* July, 1986, pp. 211–243, (hereafter, "the Henderson article", which is hereby incorporated by reference herein, disclose the features of the Rooms interface and provide descriptions of other GUIs designed to overcome the constraints imposed by screen size. Rooms® permits the sharing of information objects in different workspaces, provides the ability to store and retrieve workspaces, and provides an overview of available workspaces and other navigational aids to assist the system user in locating objects and working in the various workspaces. Each 2D workspace Room, except in the Overview, occupies most, if not all, of the available display area and has a single, fixed viewpoint. As described at pp. 228–229, of the Henderson article three mechanisms are provided for transporting tools from one workspace to another. The first mechanism uses an Overview, shown in FIG. 10 of the Henderson article, that displays miniaturized versions of all of the Rooms in the total user workspace. From the Overview, a "placement", which is a window together with location and presentation information in a particular Room, can be copied or moved from one Room to another Room, or within a single Room, via a COPY or MOVE command. A second mechanism utilizes a "baggage" metaphor that permits the user to carry,—that is, copy—tools (typically windows) with him or her as the user transits to another workspace. By executing a command while selecting a Door for exiting a first workspace, the user can specify, as "Baggage," the windows to be copied to a second workspace. The "Baggage" is then conceptually taken through the Door with the user, and the windows assume their former positions, but in the new Room, at which point the user can then reposition the windows in the new Room as desired. A third mechanism, called "Pockets," permits the user to move tools between Rooms by declaring one Room to act as Pockets. This Room will be temporarily included in any Room the user enters, and windows and tools that are placed in the user's Pockets will be presented (at the same location and with the same presentation attributes) in all Rooms. These techniques for transferring tools between Rooms is also described in U.S. Pat. No. 5,233,687 to Henderson, Jr. et al., entitled "User Interface with Multiple Workspaces for Sharing Display System Objects," at cols. 5–6, and at cols. 16–19.

Another GUI developed to explore large information spaces is known as ARK ("Alternate Reality Kit") supporting the navigable shared workspace disclosed in U.S. Pat. No. 5,107,443. ARK is also described in Smith, R., "The Alternate Reality Kit: An Animated Environment for Creating Interactive Simulations," 1986 *IEEE Computer Society Workshop on Visual Languages,* Jun. 25–27, 1986, Dallas, Tex., pp. 99–106. ARK supports a class of system object known as a "teleporter" which a user can use to make a transition from one location in navigable workspace to a location somewhere else in the navigable workspace using paired teleporters. The user does so using the conventional drag-and-drop technique to drop an object onto the teleporter in the origin location. In response, the system positions the object in the part of the shared workspace near the paired teleporter in the destination location, and at the same time makes a transition so that the view shows the part of the shared workspace that includes the paired teleporter and the object in its new location. A teleported object thus disappears from the first view during transporting and reappears in the second view. The ARK user interface may be considered to display a 2½D workspace, since the user-controlled cursor, in the shape of a hand, appears as though it floats in a plane above the other display objects.

Another large, navigable 2½D workspace is disclosed in Periin, K. and Fox, D., "Pad: An Alternative Approach to the Computer Interface," *Computer Graphics Proceedings of SIGGRAPH '93,* Anaheim, Calif., Aug. 1–6, 1993, pp. 57–64. Pad is an infinite 2D information plane that is shared among users and populated by Pad Objects with which a user can interact. Pad Objects are organized geographically; every object occupies a well defined region on the Pad surface. Pad objects make themselves visible through two mechanisms: a graphic and a portal, which is a view into the single, infinite shared desktop, analogous to a magnification glass that can peer into and roam over different parts of the Pad surface, and thus portals are used for navigation in the workspace using a navigation technique called semantic zooming. Techniques for moving or copying a Pad Object in the Pad space do not appear to be disclosed.

Robertson, Card and Mackinlay in "Interactive Visualization Using 3D Interactive Animation", *Communications ACM,* 36, 4, April 1993, pp. 57–71 (hereafter, "the Robertson article") disclose a 3D navigable workspace containing graphical objects representing visualizations of information, known as the Information Visualizer. The Robertson article discloses that the Information Visualizer evolved the multiple desktop user interface of Rooms® into a 3D workspace for information access in which 3D Interactive Objects replace the windows of the 2D Rooms environment. System users can have arbitrary positions and orientations in each Room, and techniques are provided for rapid, controlled and targeted 3D movement by the user in the workspace, such as the technique disclosed in U.S. Pat. No. 5,276,785 to Mackinlay et al., entitled "Moving Viewpoint with Respect to a Target in a Three Dimensional Workspace." As with Rooms®, an Overview is provided, allowing a user to view all the 3D workspaces simultaneously, go to any Room directly, and reach into any Room to move about and manipulate its objects. However, objects may not be moved from room to room using the Overview. Mackinlay, J., Card., S., and Robertson, G, "Rapid Controlled Movement Through a Virtual 3D Workspace," *Proceedings of SIGGRAPH '90,* August, 1990, pp. 171–176 (hereafter, the Mackinlay article), discloses the concept and basic operation of point-of-interest object movement within a single workspace of the Information Visualizer. The movement technique, based on 2D mouse input, integrates point-of-interest viewpoint movement, uses the mouse cursor to control a ray that determines the lateral position of the object, and uses keyboard keys to control the position of the object on the ray. The Mackinlay article further discloses that objects moved in this way are constrained to remain in the 3D room by clipping the object's new coordinates to the room coordinates.

The drag-and-drop and cut-and-paste techniques described above for transporting display objects within a single, desktop 2D workspace have several disadvantages when implemented in single or multiple workspace, 2½D or 3D visualization environments with multiple viewpoints: the drag-and-drop technique couples the display object to the cursor and is typically restricted to transporting a selected display object only when the viewpoint into the workspace is fixed and the destination position is perceptible, requiring its use in a context where the entire workspace is displayable on the display device, such as in the Overview of the Rooms® GUI; the conventional cut-and-paste technique does not attach a selected display object to the cursor, but removes it from the user's view while it is being operated on, and multiple objects transported at the same time do not remain in the same relationship relative to each other. Movement via teleporters in the ARK system appear to require additional steps to position the teleporters in the workspace. The point-of-interest object movement technique disclosed in the Mackinlay article is not suitable for moving objects between workspaces.

SUMMARY OF THE INVENTION

The present invention recognizes that different problems arise with respect to tracking and manipulating objects in a multiple viewpoint, navigable workspace from those that arise in a conventional, single viewpoint environment. The techniques described above for transporting a display object in a workspace often result in the selected display object disappearing from the user's view while being transported, are not applicable to transporting display objects between workspaces, or do not use standard interface navigation techniques for transporting display objects. As a result, these techniques potentially increase user disorientation while navigating in the workspace, and could affect information access efficiency. The technique of the present invention solves these problems in a multiple viewpoint, single or multiple navigable workspace environment by coupling the position of a selected display object to the user's viewpoint into the workspace at the time the object is selected for transporting, and then permitting the use of standard navigation techniques for transporting the display object to its destination location. Using the technique of the present invention, the selected display object remains perceptible to the system user during transporting as it was perceptible at the time it was selected, and the system user will always be able to track the object being transported and have more precise control over its final positioning. For example, the technique prevents the selected display object from disappearing from the user's view when the user selects another viewpoint into the same workspace, or into another workspace, that would not otherwise include a view of the selected display object. In addition, several display objects selected for transporting will remain in the same fixed relationship to each other as well as to the user as they were when they were first selected, and they will appear to the user in that fixed relationship when the user selects a second viewpoint from which to view the workspace.

The present invention for transporting a display object may be used in any navigable, multiple viewpoint 2D, 2½D, or 3D workspace, or between any two types of such workspaces. An additional user interface feature provides for displaying the selected display object with a display feature that visually distinguishes, or highlights, the display object to the system user as being selected for transporting. The transporting technique applies to both move and copy operations on the selected display object within a single workspace, or between workspaces. In addition, the data structure representing the selected display object is modified appropriately for a move or copy operation on the selected display object in a single workspace, and the workspace data structures are modified appropriately for a move or copy operation between workspaces.

This technique can be implemented on a processor-controlled system that includes a user input device for producing signals indicating actions of a system user; a display; a processor connected for receiving signals and for presenting images on the display; and memory for storing data. A first image is presented on the display that is perceptible as viewed from a first viewpoint in a first navigable workspace. The first image includes a first display object, and the first viewpoint is positioned at a first coordinate position and orientation relative to the first display object. Then, a first signal is received from the system user indicating the system user's request to transport the first display object, the first signal also indicating the system user's selection of the first display object as a selected display object. In response to the first signal, the selected display object is coupled to the first viewpoint. The term "coupling" as used herein is intended to include any combination of programming and data structure modification techniques that provides substantially the same observable result. A second signal is then received, indicating a selection by the system user of a second viewpoint. In response to the second signal, a second image is presented on the display that is perceptible as viewed from the second viewpoint. The second image includes the selected display object presented using the first viewpoint and orientation so that the selected display object is perceptible as being viewed from the first viewpoint position and orientation.

The present invention is premised on the discovery that a display object selected for transporting can be made to remain in a first perceptible relationship to the user when the viewpoint into the navigable workspace changes by actually adjusting the position in the workspace (and also the orientation or scale, depending on the number of dimensions in the workspace) of the selected display object as successive viewpoint changes are requested. In the context of a 3D workspace, coupling a selected display object to the first viewpoint is accomplished in one embodiment by storing first viewpoint coordinate and viewpoint orientation data for the first viewpoint when a second viewpoint into the workspace is selected. The selected display object is presented in a second image as perceptible as viewed from the first viewpoint by changing the selected display object's position and orientation data in the workspace by the difference between the saved viewpoint coordinate data and the second viewpoint coordinate data, and by the difference between the saved first viewpoint orientation data and the second viewpoint orientation data.

An end-of-transport signal is then received from the user input device indicating that transporting of the selected display object has been completed. In response to the end-of-transport signal, the selected display object is decoupled from the first viewpoint, and a third image is presented in the display area. The third image includes the selected display object perceptible as viewed from the second viewpoint. Decoupling a display object is accomplished when the display object's position and orientation data is no longer changed using stored viewpoint coordinate data, when there is a change in the viewpoint.

Another aspect of the transporting technique of the present invention integrates the transporting technique with the user interface's navigation, or viewpoint motion, technique. Integrating the transporting technique with the navigation techniques provided by the user interface recognizes that an effective transporting technique should be consistent with the overall metaphor of the multiple viewpoint GUI and results in increasing the effectiveness of the metaphor and the usefulness of the user interface. When the system user requests viewpoint motion in the workspace while transporting the selected display object, a plurality of viewpoint selection signals are received. In response to receiving each of the next viewpoint selection signals, a respective image is presented that is perceptible to the system user as viewed from the next viewpoint. The selected display object, however, is presented in the respective image using the stored viewpoint coordinate data so that the selected display object is perceptible as being viewed from the first viewpoint.

The present invention implemented as a processor-controlled system may include input circuitry, connected to a user input device, for receiving signals indicating actions of a system user; output circuitry connected to a display device having a display area for presenting images; a processor connected for receiving the signals from the input circuitry, and connected for providing images to the output circuitry for presentation by the display device; and instruction data stored in memory indicating instructions the processor can access and execute. The processor presents a first image on the display that is perceptible as viewed from a first viewpoint in a first n-dimensional workspace and that includes a first display object. The processor then carries out the transporting technique as described above.

The invention can also be implemented as an article of manufacture for use in a system that includes a storage medium access device such as a floppy disk drive or a CD drive. The article can include a data storage medium such as a floppy disk or a CD-ROM and data stored by the medium. The stored data indicates user signal input instructions and processor response instructions which carry out the transporting technique as described above.

The novel features that are considered characteristic of the present invention are particularly and specifically set forth in the appended claims. The invention itself, however, both as to its organization and method of operation, together with its advantages, will best be understood from the following description of the illustrated embodiment when read in connection with the accompanying drawings. In the Figures, the same numbers have been used to denote the same component parts and acts.

Figure 1:
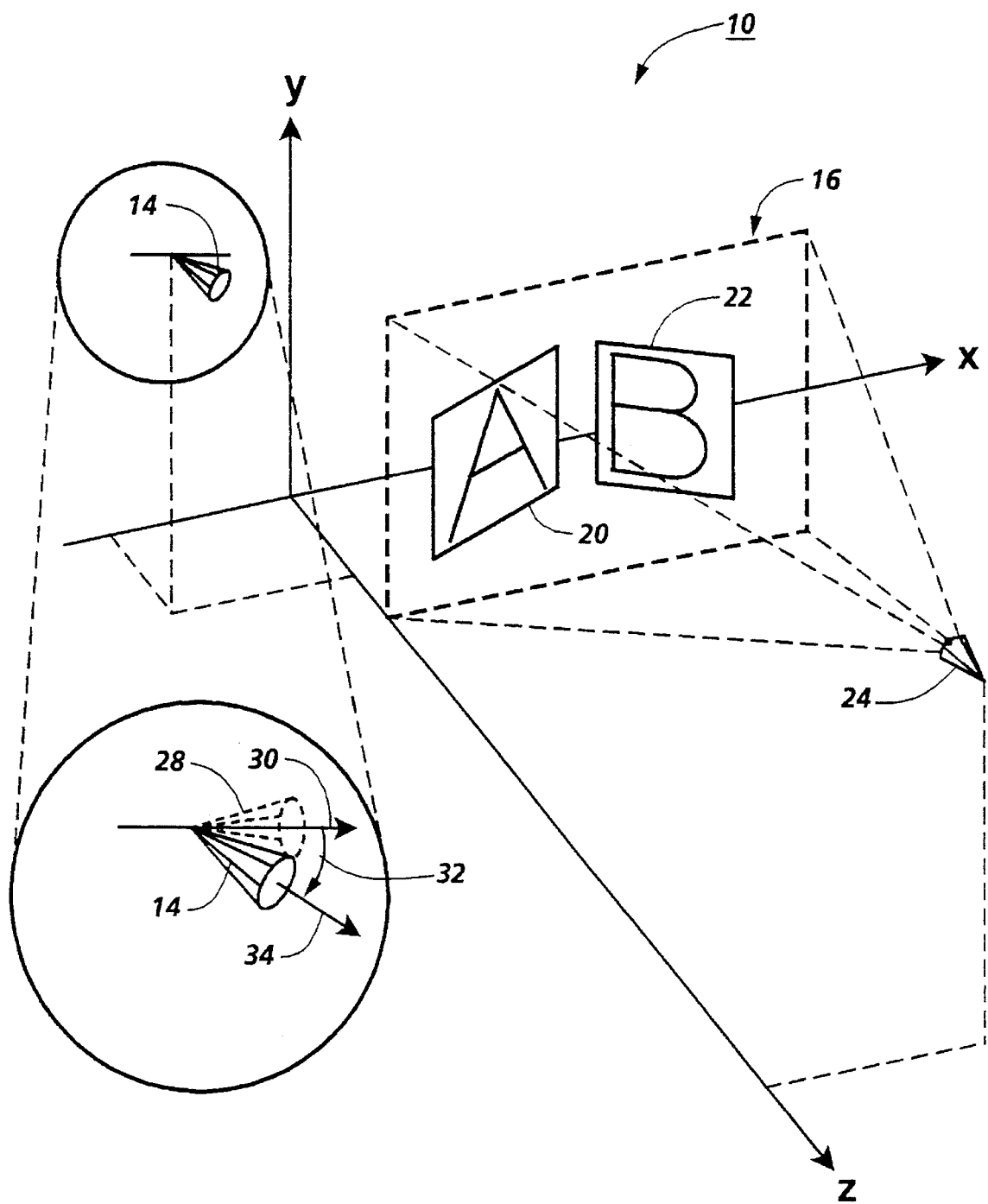
FIG. 1 schematic view of display objects in a first navigable workspace.

While the present invention will be hereinafter described in connection with an illustrated embodiment, it will be understood that it is not intended to limit the invention to that embodiment. On the contrary, it is intended to cover all alternatives, modifications and equivalents as may be included within the scope of the invention as defined by the appended claims.

DETAILED DESCRIPTION

The present invention is related to an invention described in the copending, commonly assigned patent application by the same inventor, Ser. No. 08/227,763, entitled "Coupling a Display Object To a Viewpoint in a Navigable Workspace", which is hereby incorporated by reference herein.

A. Conceptual framework

The present invention relates to operating a machine or system including a processor, and to processing electrical or other physical signals to produce other desired physical signals. The detailed descriptions which follow are presented largely in terms of display images and symbolic representations of operations of data within the memory of the system. These descriptions and representations, which are algorithmic in nature, are the techniques used by those skilled in the data processing arts to most effectively convey the substance of their work to others skilled in the art. An algorithm is here, and generally, conceived to be a self consistent sequence of acts leading to a desired result. These acts are those requiring physical manipulations of physical quantities such as electrical or magnetic signals that are capable of being stored, transferred, combined, compared, and otherwise manipulated. It proves convenient at times, principally for reasons of common usage, to refer to these signals by a variety of terms, including bits, values, elements, pixels, symbols, characters, terms, numbers, items, or the like. However, all of these terms and the additional terms defined below are convenient labels applied to appropriate physical quantities.

Further, the manipulations performed are often referred to in terms, such as adding, comparing, or determining, which are commonly associated with mental operations performed by a human user. Apart from supplying certain signals to the machine or system operated by the invention, the capability of a human user is neither necessary nor desirable in the operations described herein which form part of the present invention.

In addition, the algorithmic descriptions of the invention that are presented herein for operating the system are not inherently related to any particular processor, machine, or other apparatus. The machine or system may be specially constructed for the required purposes or it may comprise a general purpose computer selectively activated or reconfigured by a computer program stored in the computer. Useful machines for performing the operations of the present invention include general purpose digital computers or other similar devices configured as described below and in the claims.

The following terms provide the framework for describing the embodiment of the claimed invention illustrated in the accompanying drawings. These terms have the meanings indicated below throughout this specification and in the claims, rather than any meanings that may occur in other sources, such as, for example, the documents incorporated by reference herein elsewhere in this description.

The term "data" or "data item" refers herein to physical signals that indicate or include information. Data items can be combined into a "data structure" such that the data structure "includes" the combined data items; thus, a "data structure" is any combination of interrelated data. A data structure may also include other data structures. An item of data "indicates" a thing, an event, or a characteristic when the item has a value that depends on the existence or occurrence of the thing, event, or characteristic or on a measure of the thing, event, or characteristic. When an item of data can indicate one of a number of possible alternatives, the item of data has one of a number of "values". For example, viewpoint coordinate data indicates information about the viewpoint into a three dimensional workspace when the viewpoint coordinate data includes a value for the x, y and z coordinates of the position of the viewpoint and a value for the x, y and z coordinates of the orientation of the viewpoint in the workspace. A first item of data "indicates" a second item of data when the second item of data can be obtained from the first item of data, when the second item of data can be accessible using the first item of data, when the second item of data can be obtained by decoding the first item of data, or when the first item of data can be an identifier of the second item of data. For example, when a first item of data indicates position information of an image display feature in the display area of a display device, and the position information may be used by the processor to obtain a second data item in a data structure, the first item of data indicates the second item of data.

A "processor-controlled system" or "processor" is any machine, component or system that can process data, and may include one or more central processing units or other processing components. Any two components of a machine or system are "connected" when there is a combination of circuitry that can transfer data from one of the components to the other. An "instruction" is an item of data that a processor can use to determine its own operation. A processor "uses" data in performing an operation when the result of the operation depends on the value of the data. A processor executes a set of instructions when it uses the instructions to determine its operation, and an "operation" results from the processor executing the set of instructions. Thus, a set of instructions may be considered to be an operation.

"Memory" is any component, combination of components, circuitry, or system that can store data, and may include local and remote memory and input/output devices. An example of memory is a storage medium access device with a data storage medium that it can access. A "data storage medium" or "storage medium" is a physical medium that can store data. Examples of data storage media include magnetic media such as floppy disks and PCMCIA memory cards, optical media such as CD-ROMs, and semiconductor media such as semiconductor ROMs and RAMs. As used herein, "storage medium" covers one or more distinct units of a medium that together store a body of data. For example, a set of floppy disks storing a single body of data would be a storage medium. A "storage medium access device" is a device with circuitry that can access data on a data storage medium. Examples include floppy disk drives and CD-ROM readers.

An "image" is a pattern of light. A "display" or "display device" is a device that provides output defining an image that includes information in human perceptible form. A display may, for example, include a cathode ray tube; an array of light emitting, reflecting, or absorbing elements; a device or structure that presents marks on paper or another medium; or any other device or structure capable of defining an image in a visible form. A "display area" is the portion of the display in which an image is presented or the medium which receives an image. Data "defines" an image when the data includes sufficient information for the processor to directly produce the image, such as by presenting the image on a display. Data defining an image may be referred to as "image definition data". The processor "presents" an image on a display when an operation executed by the processor produces image definition data defining the image and provides the image definition data defining the image to output circuitry connected to the display for display in the display area so that the image is perceptible to a system user.

The term "display feature" refers to any human perception produced by the display in the system. A "display object" is a visually distinguishable display feature that is perceptible as a coherent unity. A display object "includes" a display feature if presentation of the display object can produce perception of the display feature. A display object that has a distinguishable outline and a bounded area may be called a "region". An image "includes" a display feature or display object if presentation of the image can produce perception of the feature or display object. For example, display object 22 in FIG. 5 "includes" display features 35 when the system user can perceive the display features presented, such as, for example, the narrow, colored vertical bars or stripes that have been added to selected display object 22 in FIG. 5 indicating that the display object has been selected for transporting.

In a processor-controlled machine or system, there is a mapping between items of data within the system and display features included in images presented by the system. A display feature "represents" a body of data when the display feature can be mapped to one or more items of data in the body of data, or, stated in another way, a display feature "represents" the item or items of data to which it can be mapped. For example, the display object selected in the first image for transporting may represent one or more object data structures that have values indicating both display information about the display object, such as, for example, its coordinates in the workspace, its graphical or character shape, its color and the like, and content information, such as character data.

A "workspace" is a display feature within which other display features or display objects in an image are perceived as having respective spatial positions relative to each other, as for example, in a space. A workspace can be a display feature with a visible boundary on the display, such as a window, but a workspace need not have a visible outer boundary, nor does the entire workspace need to be displayed at one time in order to produce the perception of a workspace. The presentation of a workspace, or a portion thereof, produces the human perception of display features in respective relative positions. A workspace is perceived as being viewed from a viewing position, and this position is called the "viewpoint." In a three-dimensional workspace, described in more detail below, the viewpoint may be one of many positions within the workspace. In a two-dimensional (2D) workspace, the viewpoint is a viewing position into the workspace that is typically orthogonal to the workspace. A 2D workspace may have more than one viewpoint into the workspace from which it may be viewed. An example of such a 2D workspace is a 2D window that provides for changing the contents displayed in the window, as, for example, by scrolling the window's contents. This scrolling effectively results in changing the viewpoint in the minus-y direction in a 2D plane defined by an x-y coordinate axis.

A "three-dimensional workspace" is a workspace that is perceived as extending in three orthogonal dimensions. Typically, a display has a 2D display surface and the perception of a third dimension is produced by visual clues such as perspective lines extending toward a vanishing point; obscuring of distant objects by near objects; size changes in objects moving toward or away from the viewer; perspective shaping of objects; different shading of objects at different distances from the viewer, and so forth. Three-dimensional (3D) workspaces include not only workspaces in which all of these cues combine to produce the perception of three dimensions, but also workspaces in which a single cue can produce the perception of three dimensions. For example, a workspace with overlapping display objects or a workspace within which a view can zoom in on a display object can be a 3D workspace even though display objects within it are presented in orthographic projection, without perspective. This latter example of a workspace is often referred to as a "2½D" workspace.

Data indicating the viewpoint into a 3D workspace includes x, y, and z coordinate data indicating the viewpoint's position. Data indicating the viewpoint into a 3D workspace may also include data indicating the viewpoint's "direction of orientation" into the workspace. The direction of orientation is the direction from the viewpoint into the field of view along the axis at the center of the field of view. Each viewpoint into a 3D workspace provides a view into the workspace that is delineated by a truncated pyramid structure called a viewing frustrum. An example of a viewing frustrum is shown in FIG. 1. A viewing frustrum is specified by specifying two items: the position of the user's eye and the position of a point in the workspace to be centered in the view. A viewing transform automatically produces an axis defined by these two items which is called the "line of sight." The "line of sight" is a ray cast from the user's eye through the center of the viewing frustrum and produces an axis orthogonal to the image surface of the display.

A viewpoint into a workspace may be controlled by a system user using a user input device that provides signals for controlling the viewpoint, such as, for example, one or more key combinations on a keyboard, or the pressing of buttons on a mouse, or by a body-mounted device that senses actual physical movement, such as a head-mounted device that senses head movement. A viewpoint into a workspace is distinguishable from a cursor position in the workspace with which a user may directly manipulate objects in the workspace.

"Viewpoint motion" occurs when a sequence of images is presented that are perceptible as a series of views of an n-dimensional workspace from each of a series of moving or displaced viewpoints. This perception may result from perception of display features or display objects in the workspace as "continuations" or "moved continuations." A second display feature is perceptible as a "continuation" of a first display feature when presentation of the second display feature follows presentation of the first display feature in such a way that the user perceives the first display feature as being continued when the second display feature is presented. This can occur when the successive display of two display features is so close in time and space that they appear to be the same display feature. An example of this is the phenomenon called "object constancy." A second display feature is perceptible as a "moved continuation" of a first display feature if it is perceptible as a continuation in a different position. The first display feature is perceived as "moving" or as having "movement" or "motion" or as being "displaced."

A "navigable workspace" is a workspace in which a user can determine the part of the workspace that is presented on the display by requesting changes in the viewpoint. Presentation of part of a navigable workspace in response to a user input signal requesting viewpoint motion, can produce the perception of controlling movement within a workspace. Signals from a user input device requesting a change of viewpoint into the workspace are synonymous with a user action requesting viewpoint motion.

The location of a display object included in a workspace is described by its position in the workspace, which is called its "absolute position." In a 2D workspace, the object's absolute position is expressed by its x, y coordinates in the workspace. In a 3D workspace, a display object's absolute position is expressed by its x, y, z coordinate position. In a 3D workspace, the location of a display object is also described by its absolute orientation in the workspace. For example, display objects 20 and 22 in FIG. 1 each have an orientation in 3D workspace 10 that is expressed by the x, y, z coordinates of the object's rotation, scaling, and translation in the workspace. In the workspace shown in FIGS. 29–34, the absolute orientation of display object 514 is expressed by the object's scale in the workspace.

A display object included in a workspace may also have the characteristic of being "location sensitive," and "user selectable," meaning that the entire display object, or a display feature within the display object, may be selected by user signals indicating the location of that display feature, or of the display object, in the workspace. In general, an action by a user "indicates" a thing, an event, or a characteristic when the action demonstrates or points out the thing, event or characteristic in a manner that is distinguishable from actions that do not indicate the thing, event, or characteristic. A signal from a user input device indicates selection of a location sensitive display object, or indicates a position in an image, if the signal includes data from which the display object or position can be uniquely identified. For example, if a signal includes data indicating a mouse pointer displacement, a system can find a point in the display plane based on the previous pointer position. This point can then be used to project a ray from the viewpoint into the 3D workspace being presented, and the coordinates of display objects in the workspace can be used to find the nearest display object intersected by the ray.

In an object-based, or object-oriented, system, a set of instructions constituting an operation may be represented by a location sensitive, selectable display object in an image. A user signal may include a request to initiate or invoke an operation and information identifying the requested operation, wherein the signal or signals indicate one or more actions by a system user intended to cause performance of the operation. An operation is performed by the system "in response" to one or more user signals when the signals received are for indicating a valid request for a valid operation and for causing the operation to be performed. Signals indicating a single complete request or action may include a combination of any number of signals indicating a valid request for a valid operation and for causing the operation to be performed.

B. General Features

Figure 2:
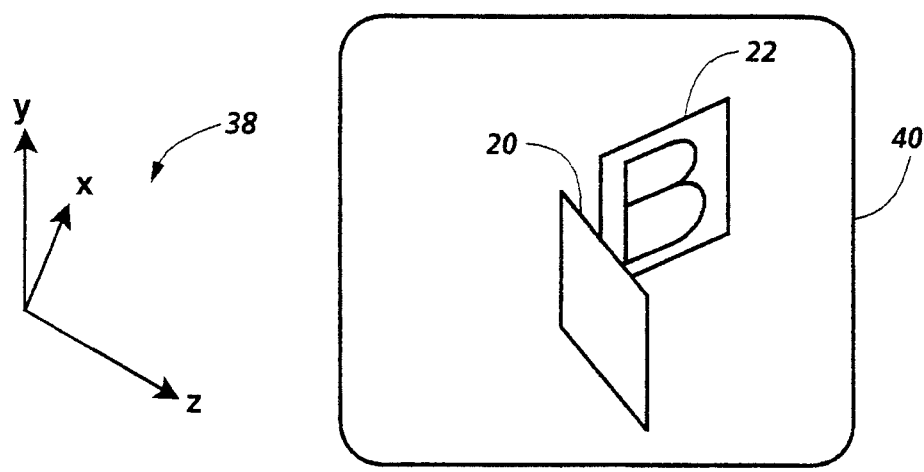
FIG. 2 is a schematic view of a presented image that includes the display objects shown in FIG. 1 from a first viewpoint.
Figure 3:
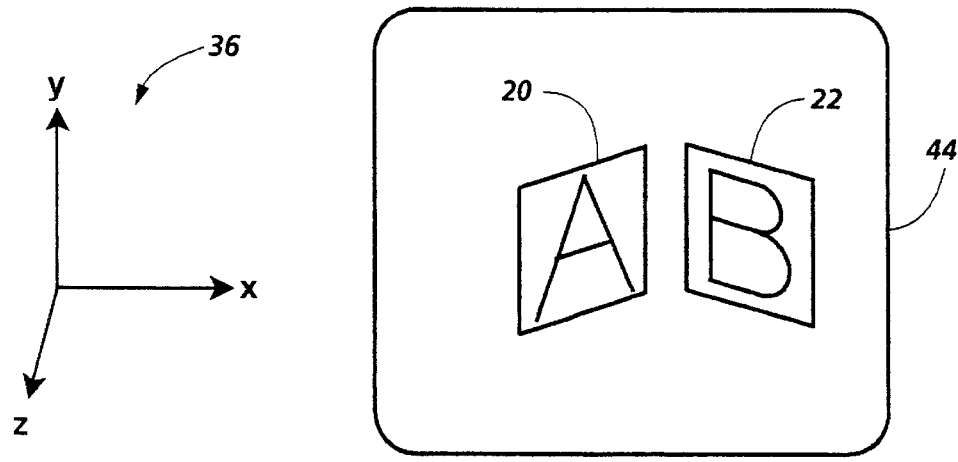
FIG. 3 is a schematic view of a presented image that includes the display objects shown in FIG. 1 from a second viewpoint.
Figure 10:
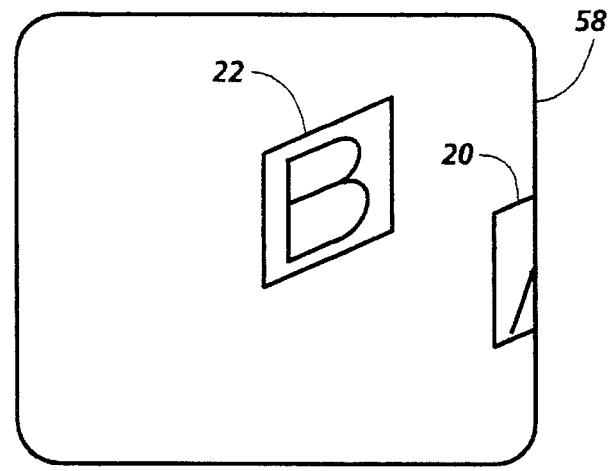
FIG. 10 is a schematic view of a presented image, presented in response to the system receiving an end-of-transport signal according to the steps shown in FIG. 20.
Figure 11:
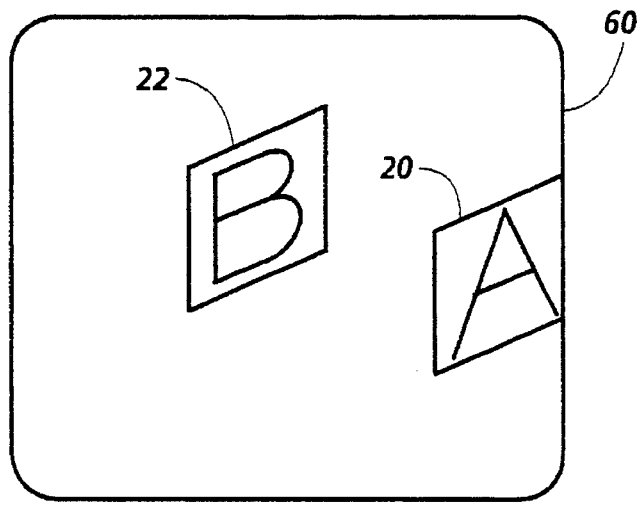
FIG. 11 is a schematic view of a presented image that illustrates viewpoint motion in the workspace of FIG. 1, and illustrates the decoupling of a selected display object from a first viewpoint, according to the steps shown in FIG. 20.
Figure 12:
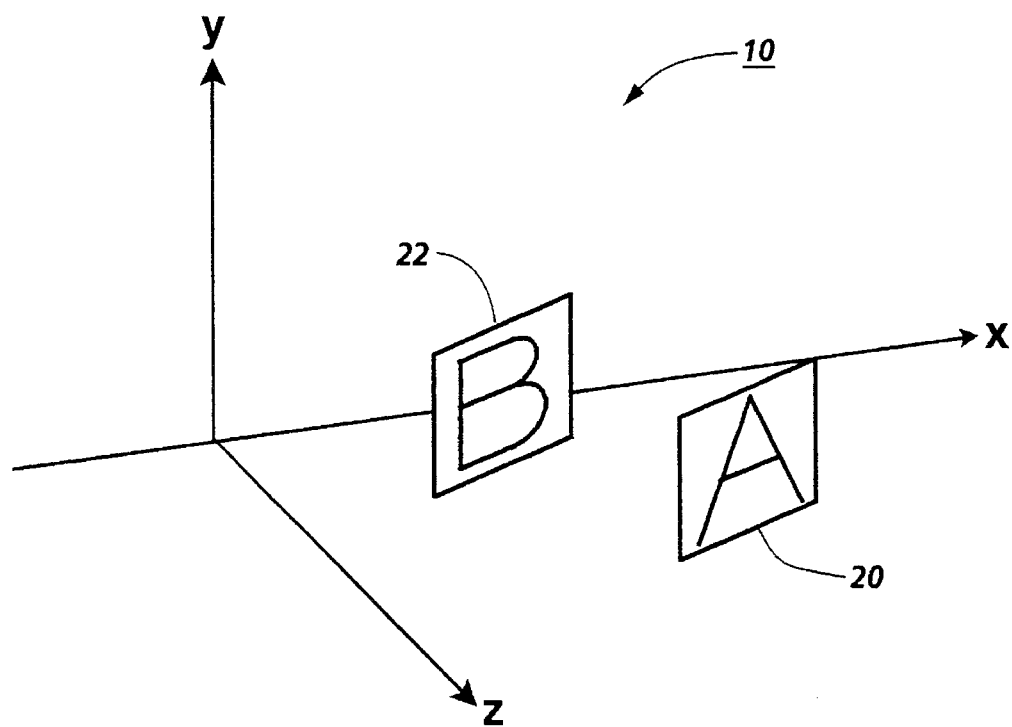
FIG. 12 is a schematic view of the transported display object in its new absolute position in the first navigable workspace.
Figure 18:
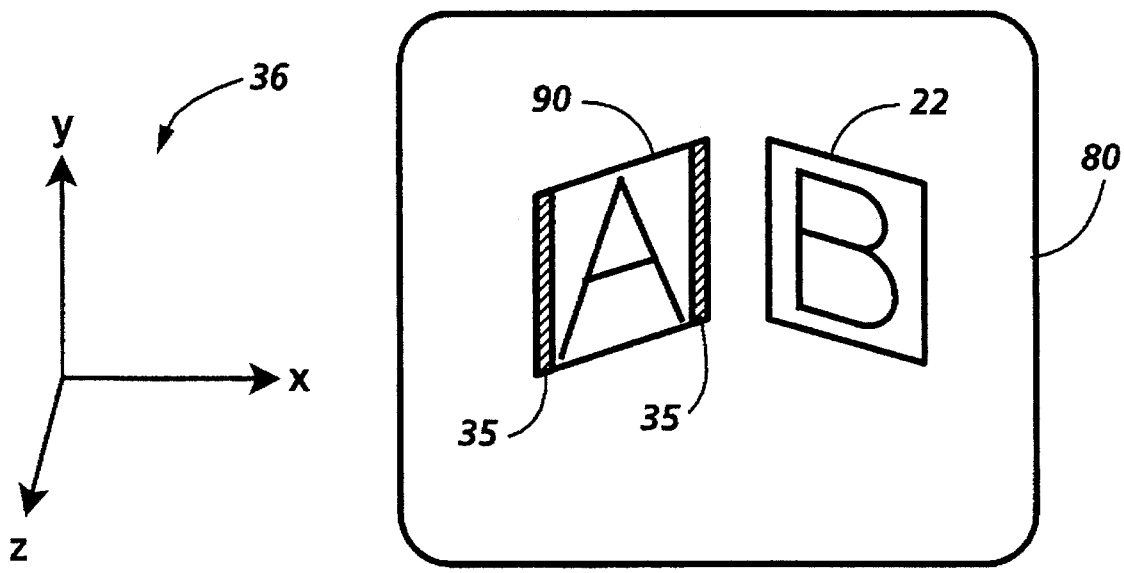
FIG. 18 is a schematic view of a presented image that includes the display objects shown in the first workspace of FIG. 1 from a first viewpoint therein, showing one display object selected for copying.
Figure 19:
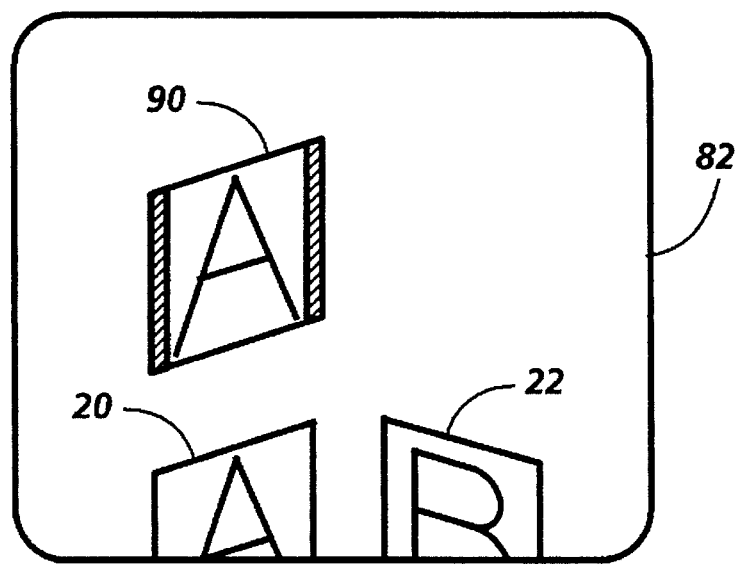
FIG. 19 is a schematic view of a presented image that includes the display objects shown in the first workspace of FIG. 1 from a second viewpoint therein, showing both the copied, selected display object and the original display object.
Figure 20:
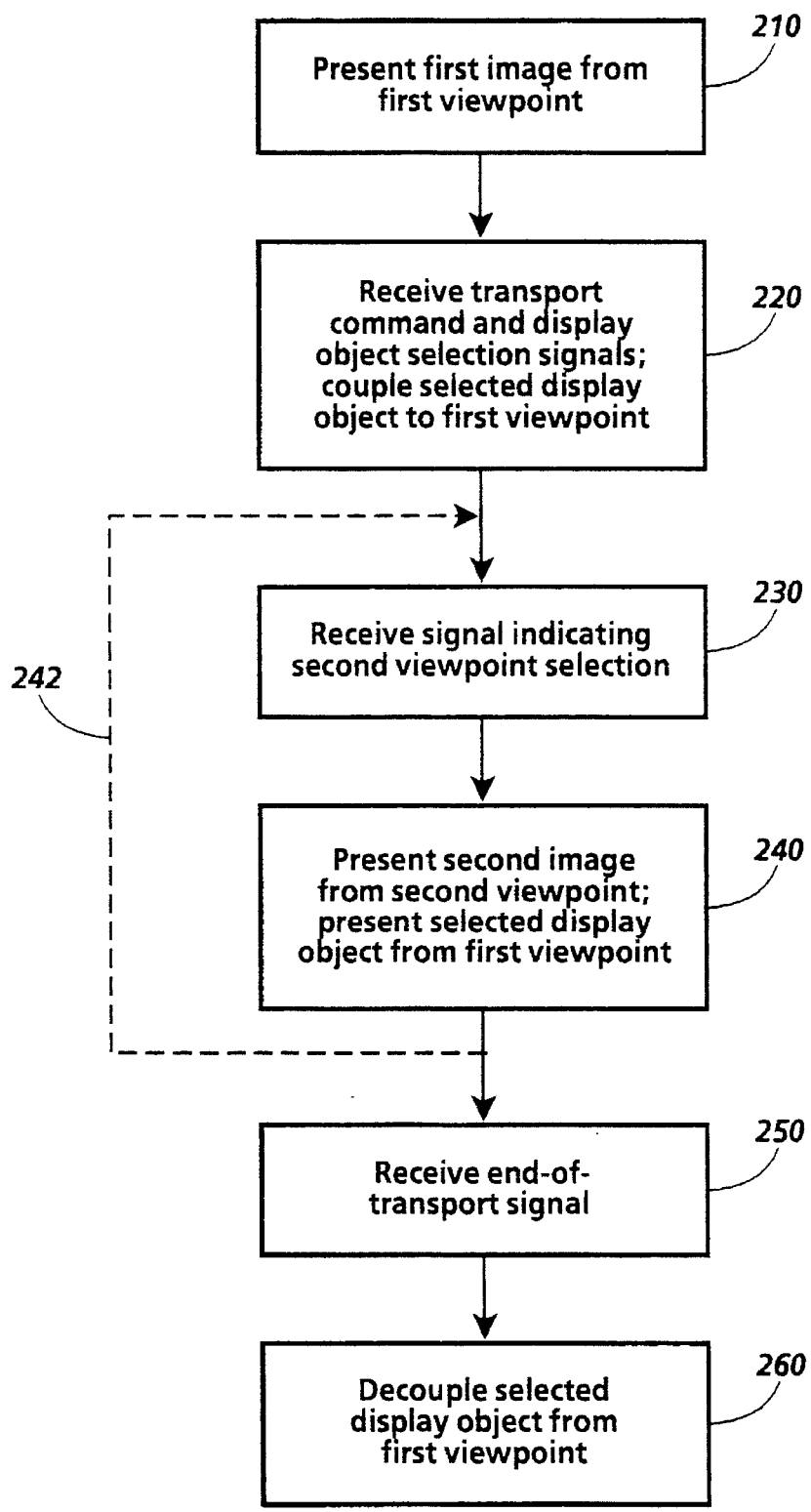
FIG. 20 is a flow chart illustrating the steps of the present invention for transporting a display object in a workspace.

FIGS. 1–20 illustrate the general features of the present invention of transporting a display object to a destination position within a navigable workspace, or between navigable workspaces. FIGS. 1–3 illustrate the general concept of multiple viewpoints into a navigable workspace. FIGS. 4–11 illustrate the sequence of presented images resulting from transporting a display object in a navigable workspace according to the present invention, and FIG. 12 shows the resulting position of the transported objects. FIGS. 13–17 illustrate a sequence of presented images resulting from transporting a display object from a first navigable workspace to a second workspace. FIGS. 18 and 19 illustrate the initial sequence of images that result from copying a display object for transporting. FIG. 20 illustrates the general steps of the present invention.

1. Viewpoints into a navigable workspace.

FIG. 1 illustrates navigable workspace 10, which happens to be a three-dimensional workspace, with the orthogonal axes oriented as shown. Workspace 10 contains two display objects 20 and 22; display object 22 is location sensitive. Display objects 20 and 22 each have a coordinate position in workspace 10 which is called the object's absolute position. FIG. 1 also illustrates first and second viewpoints 14 and 24 into navigable workspace 10. In a processor-controlled system that presents images of workspace 10 to a system user, the user viewing workspace 10 from viewpoint 14 will see image 40 in FIG. 2; thus, image 40 is perceived by the system user as viewed from viewpoint 14 in workspace 10. Coordinate axis 38 shows the orientation of the coordinate axis of workspace 10 from viewpoint 14. First viewpoint 14 in FIG. 1 can be seen to include a direction of orientation 34 which is shown to be at an angle 32 downward (in the y direction) from the direction of orientation 30 that viewpoint 24 would have if it were in a normal position looking into workspace 10. Each viewpoint into workspace 10 provides a view into the workspace that is delineated by a truncated pyramid structure called a viewing frustrum. Viewpoint 24 provides a view into workspace 10 that is illustrated by viewing frustrum 16. The user viewing workspace 10 from viewpoint 24 will see image 44 in FIG. 3. Coordinate axis 36 shows the orientation of the coordinate axis of workspace 10 from viewpoint 24.

2. Transporting display objects within a workspace.

Figure 4:
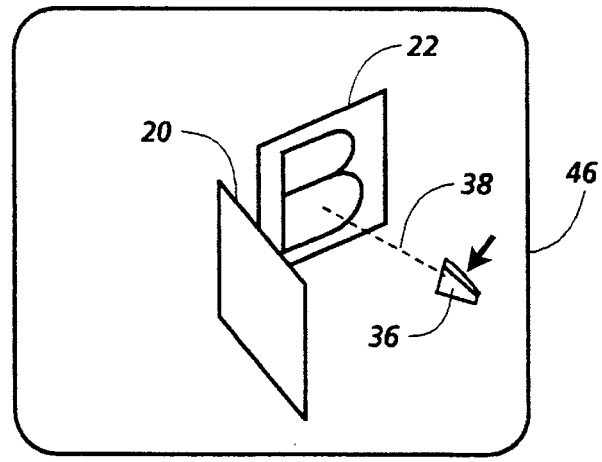
FIG. 4 is a schematic view of a presented image that includes the display objects shown in FIG. 1 from the first viewpoint, and showing a transport command cursor.
Figure 5:
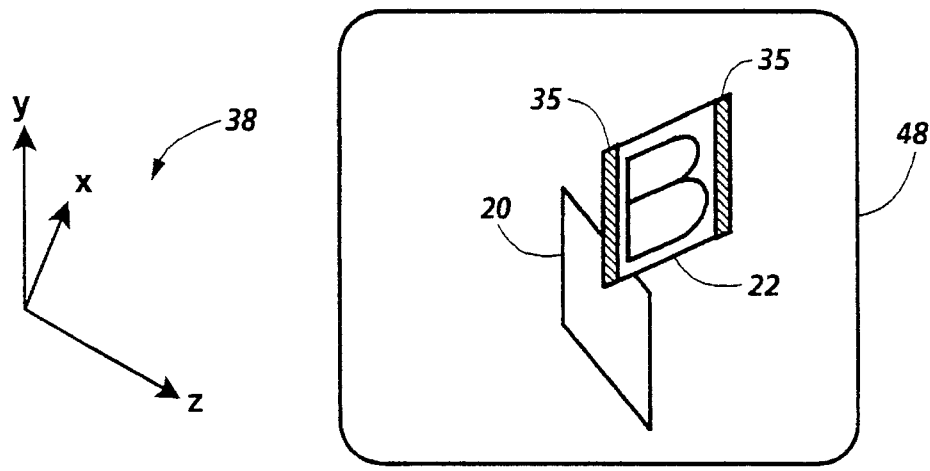
FIG. 5 is a schematic view of a presented image, presented in response to a system user selecting a display object for transporting according to the steps shown in FIG. 20.

A general overview of the steps of the present invention is illustrated in FIG. 20, and reference will be made to FIG. 20 during the discussion of the sequence of images in FIGS. 4–11 that illustrate transporting display objects within a workspace. FIG. 2 illustrates a first image 40 presented according to box 210 in FIG. 20. As noted above, the system user perceives image 40 as viewed from first viewpoint 14; image 40 includes display object 22. Next, step 220 receives signals from the system user indicating a transport command. FIG. 4 illustrates image 46 into workspace 10 from first viewpoint 14, and also illustrates transport command cursor 36, which is presented in response to the transport command signal; transport command cursor 36 provides a visual indication to the system user that the transport command has been selected, and that a display object in workspace 10 should be selected for transporting. The user may select a display object by moving transport cursor 36 to display object 22, for example, along line 38 in workspace 10. In response to selecting display object 22, the system preferably presents selected display object 22 with some sort of visual indication that the object has been selected. FIG. 5 illustrates image 48 presenting selected display object 22 having a pair 35 of vertical colored display features to provide this visual feedback. Any suitable visual change to the selected display object, such as, for example, changing its color, adding a drop shadow, or making its outline display features thicker, may be used in place of the illustrated pair 35 of vertical colored display features, and such a visual change to the display features of the selected display object will hereafter be called "transport highlighting."

In addition, selected display object 22 is preferably presented in image 48 with no portion of the object obscured by any other display object. This is accomplished by rendering selected display object 22 last in image 48, such that any objects in workspace 10 and image 48 that might otherwise be rendered in a sequence that would obscure all or part of selected display object 22 cannot do so. Also in response to selecting display object 22 for transporting, the step in box 220 couples selected display object 22 to first viewpoint 14 during transporting.

The step in box 230 receives a second viewpoint signal indicating the user's selection of a second viewpoint. For purposes of illustration, the second viewpoint will be viewpoint 24 shown in workspace 10, but the second viewpoint may be a viewpoint selected in a second workspace, as discussed below in the discussion accompanying FIGS. 13–17.

Figure 6:
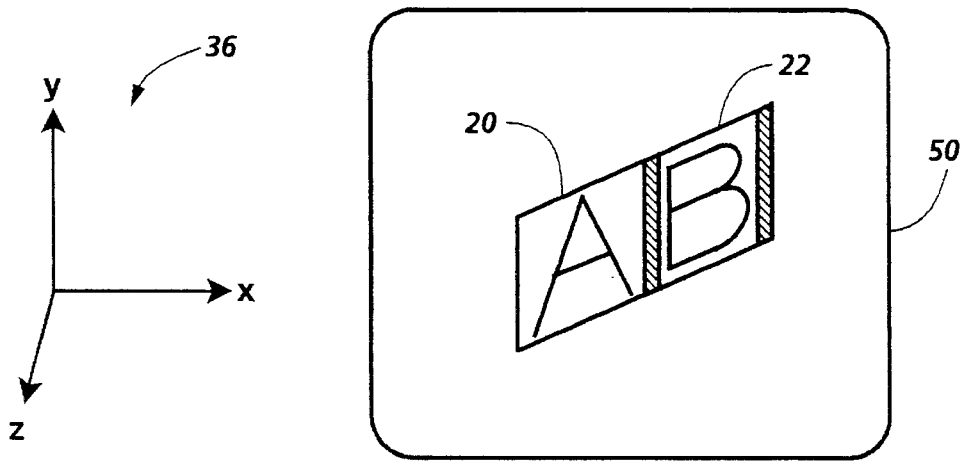
FIG. 6 is a schematic view of a presented image, presented in response to a system user selecting a second viewpoint from which to view the workspace of FIG. 1 according to the steps shown in FIG. 20.

In response to the user's selection of second viewpoint 24, the step in box 240 of FIG. 20 presents a second image 50 (FIG. 6). Second image 50 of workspace 10 is perceived by the system user as viewed from viewpoint 24 in workspace 10. Image 50 shows display object 20, which is perceived by the system user as viewed from second viewpoint 24. Image 50 also shows selected display object 22 in a new position in workspace 10, as perceived as viewed from first viewpoint 14.

Figure 7:
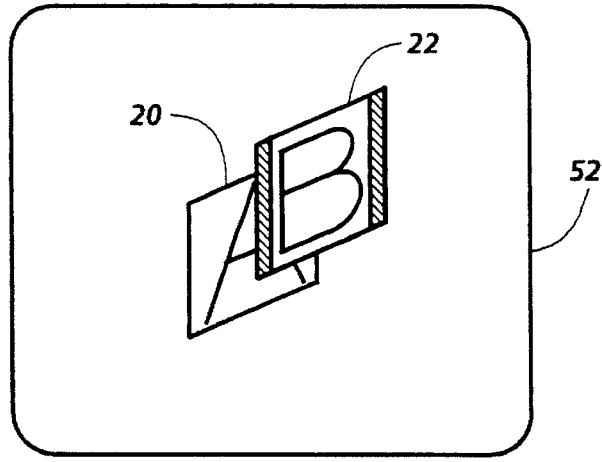
FIGS. 7–9 are a sequence of schematic views of presented images that illustrate viewpoint motion in the workspace of FIG. 1, and illustrate coupling a selected display object to a first viewpoint, according to the steps shown in FIG. 20.
Figure 8:
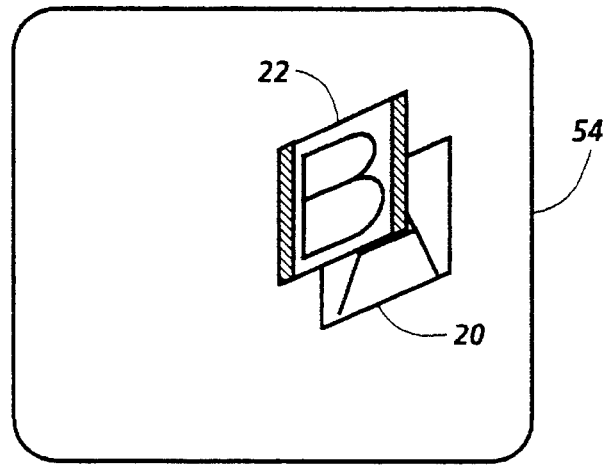
Figure 9:
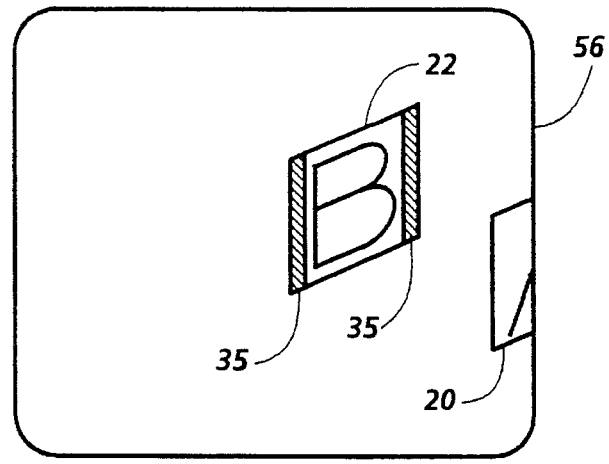

The system user may request viewpoint motion in the workspace while transporting a selected display object by selecting one or more additional viewpoints from which to view workspace 10. From each selected viewpoint, selected display object 22 will always be perceptible as viewed from first viewpoint 14. Viewpoint motion is shown in the flowchart of FIG. 20 by dotted line 242. For example, FIGS. 7, 8 and 9 illustrate the concept of viewpoint motion in workspace 10, presenting respective images 52, 54, and 56 which illustrate a series of three changed viewpoints into workspace 10 that result from displacing viewpoint 24 laterally in the minus-x direction in the coordinate axis system shown in FIG. 1. Images 52, 54, and 56 produce the perception that each of the successive images of display object 20 is a moved continuation of the previous image of display object 20, which in turn produces the perception to the system user of navigating around workspace 10 by moving to the left on the x-axis in workspace 10. In contrast to display object 20, selected display object 22 is perceived in each of the respective images 52, 54, and 56 in the same position in relationship to first viewpoint 14 as it was at the time display object 22 was selected for transporting, thus producing the perception that selected display object 22 is fixed at a position in workspace 10 relative to the system user's eye during viewpoint motion.

The user may release selected display object 22 in the position it is perceived to be in image 56 by sending an end-of-transport signal to the system, which the system receives in box 250. In response to the end-of-transport signal, the step in box 260 decouples selected display object 22 from viewpoint 14. If transport highlighting has been added to selected display object 22, the system may present display object 22 without transport highlighting in response to the end-of-transport signal. FIG. 10 illustrates display object 22 in image 58 without transport highlighting. In subsequent views of workspace 10 from other viewpoints, successive images of display object 22 will provide the perception that display object 22 is a moved continuation of the previous image of display object 22, and will no longer be perceived as being in the same position in relationship to, and at the same distance from, a single viewpoint. FIG. 11 illustrates the system user displacing viewpoint 24 laterally in the plus-x direction in the coordinate axis system shown in FIG. 1, resulting in the system presenting image 60 of workspace 10. The sequence of respective images 58 and 60 give the perception to the system user that the user is navigating around workspace 10 by moving to the right on the x-axis in workspace 10 and illustrate that both display objects 22 and 20 are perceived as viewed from the respective viewpoints of the respective images. FIG. 12 illustrates navigable workspace 10 having display object 22 now moved to a new absolute position as a result of the transport operation.

Coupling a display object to a viewpoint results in the display object being repositioned in the workspace in response to a change in viewpoint into the workspace. Coupling may be accomplished using a variety of techniques. One technique is described below in the description of an illustrated implementation, and uses one or more display object properties to identify display objects being transported for determining updated workspace positions in response to a change in viewpoint.

3. Transporting a display object to a second workspace.

Figure 13:
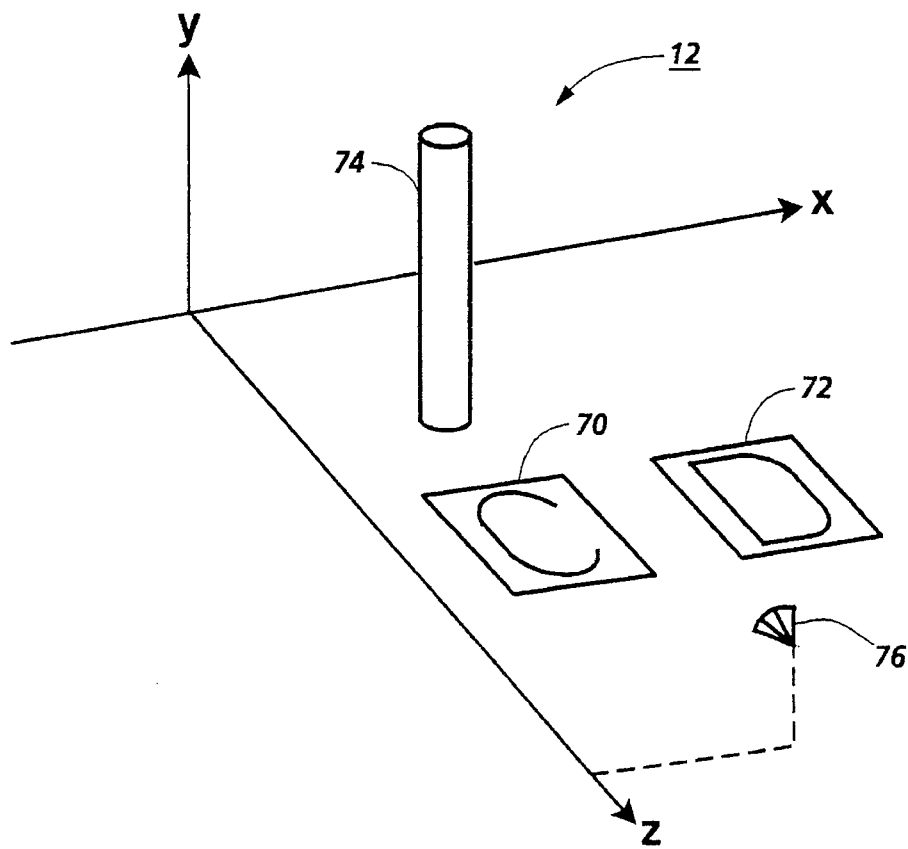
FIG. 13 is a schematic view of display objects in a second navigable workspace.
Figure 14:
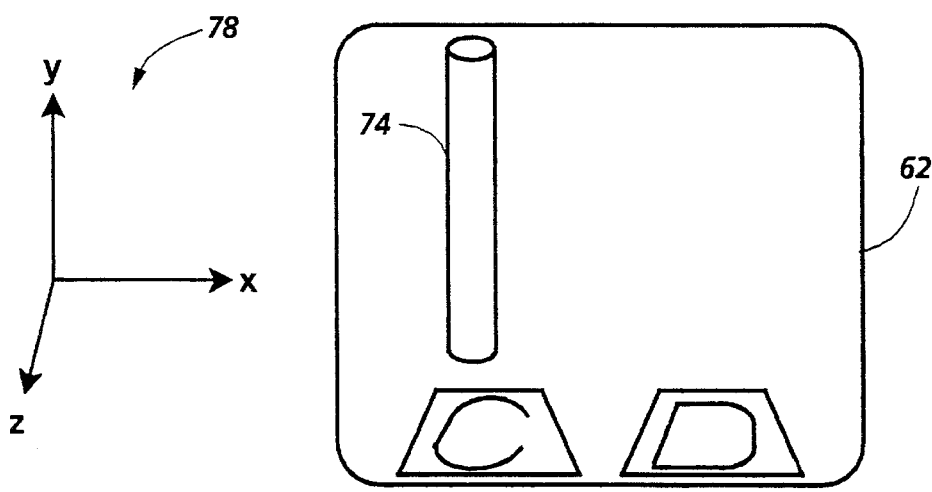
FIG. 14 is a schematic view of a presented image that includes the display objects shown in the navigable workspace of FIG. 13 from a viewpoint therein.

The method of the present invention may also be used to transport one or more display objects from a first workspace to a second workspace. FIG. 13 illustrates second navigable workspace 12, which is also a three-dimensional workspace, with the orthogonal axes oriented as shown. Workspace 12 contains display objects 70, 72, and 74, each having an absolute position in workspace 12 as shown. FIG. 13 illustrates viewpoint 76 into navigable workspace 12. The user viewing workspace 12 from viewpoint 76 will see image 62 in FIG. 14, and image 62 is perceived by the system user as viewed from viewpoint 76 in workspace 12.

Figure 15:
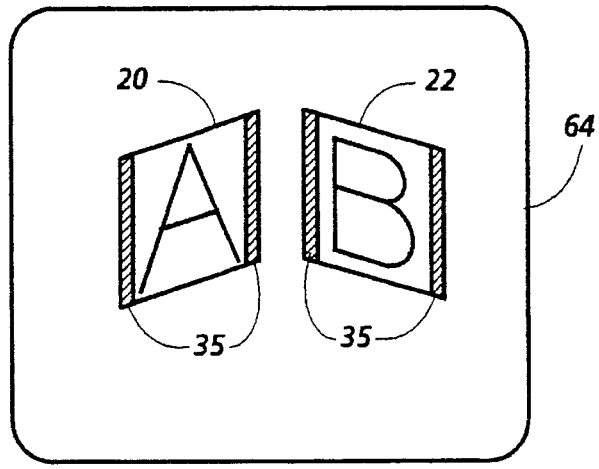
FIG. 15 is a schematic view of a presented image that includes the display objects shown in the first workspace of FIG. 1 from a viewpoint therein, showing them selected for transporting.

FIG. 15 shows presented image 64, which is a view into workspace 10 of FIG. 1 from viewpoint 24. With reference again to FIG. 20, image 64 also shows colored horizontal bar display features 35, indicating that the system, in box 220 of FIG. 20 has received a signal from the user indicating selection of both display objects 20 and 22 for transporting. The step in box 230 receives a second viewpoint signal indicating the user's selection of second viewpoint 76 in second workspace 12. In response to the user's selection of second viewpoint 76, in box 240 of FIG. 20 the system presents second image 66, shown in FIG. 16. Image 66 shows both selected display objects 20 and 22 in positions in workspace 12 that are perceived as viewed from first viewpoint 24 in workspace 10. Because it is still selected for transporting, selected display object 20 is rendered after other display objects in image 66, and thus is perceived as overlapping and in front of display object 74 in workspace 12.

In a manner similar to transporting a single display object, the user may release selected display objects 20 and 22 in their positions in workspace 12 by sending an end-of-transport signal to the system, which the system receives in box 250. In response to the end-of-transport signal, the system decouples selected display objects 20 and 22 from viewpoint 24, in box 260, and presents display objects 20 and 22 without the display features in response to the end-of-transport signal. FIG. 17 illustrates display objects 20 and 22 in image 68 as positioned in workspace 12. Image 68 shows that display object 20 is in fact behind display object 74 in workspace 12.

4. Preserving the spatial relationship among plural display objects selected for transporting.

Figure 16:
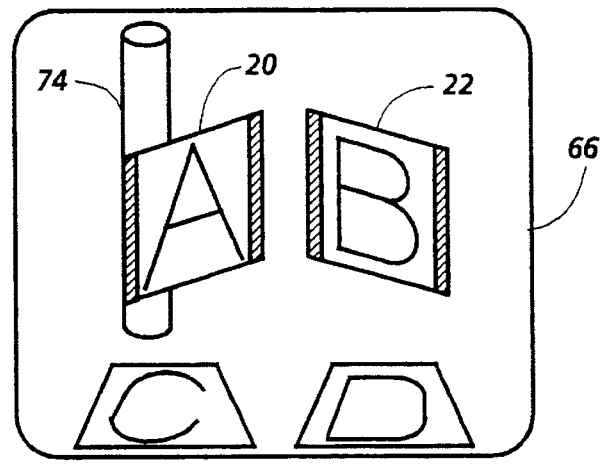
FIG. 16 is a schematic view of a presented image that includes the second workspace of FIG. 13 from a viewpoint therein, and shows the selected display objects moved from the first workspace to the second workspace, in a position coupled to the viewpoint of the first workspace.
Figure 17:
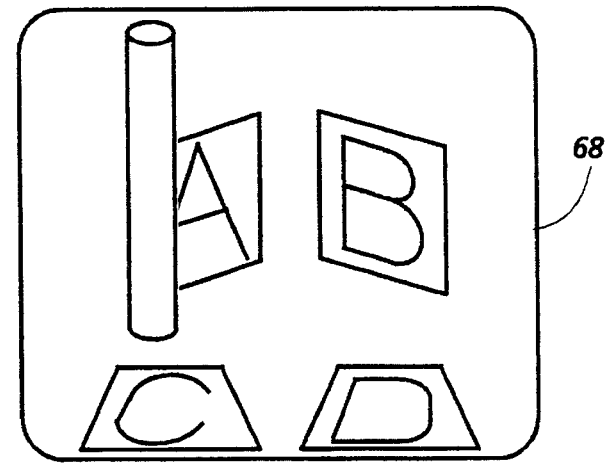
FIG. 17 is a schematic view of a presented image that includes the second workspace of FIG. 13 from the first viewpoint, including the moved display objects perceived from the first viewpoint in the second workspace.

The sequence of FIGS. 15–17 also illustrates that the present invention preserves the spatial relationship in the workspace of plural display objects that are selected for transporting when viewing a workspace from the same first viewpoint. This method of transporting, then, is fundamentally different from some transport methods which require the system user to directly manipulate display objects one by one into new positions in the same or different workspace, requiring the system user to estimate the prior spatial relationship between plural display objects that are intended to be in the same spatial relationship after transporting.

5. Transporting a copy of a display object.

The present invention may also be used to transport a copy of a display object within a workspace or between workspaces in a manner similar to that described earlier with respect to FIG. 20 and moving an object within a workspace or between workspaces, except that there is additional visual information presented to the system user to indicate that a selected display object copy is being transported. When the system receives a signal from the user indicating a copy operation is to be performed and indicating the selected display object, an image copy of the selected display object is presented to the user in response to the selections. FIG. 18 shows presented image 80, which is a view into workspace 10 of FIG. 1 from viewpoint 24. Image 80 shows selected display object 90 having transport highlighting display features 35 indicating object selection. Selected display object 90 is a copy of display object 20 (shown in image 44 in FIG. 3). In image 80, selected display object 90 is shown as actually occupying the same physical space in workspace 10 as display object 20, so that display object 20 cannot be perceived from viewpoint 24. In other implementations of the present invention, a copy of a selected display object such as selected display object 90, may be presented as slightly offset from the original display object so that it may be immediately perceived as a copy. However, such an alternative results in the copy of the display object having a different position in the workspace from that of the original display object, and thus will not be effective in cases where preserving the original display object position and orientation is important. FIG. 19 shows presented image 82, which is a view into workspace 10 of FIG. 1 from a viewpoint that is in the plus-y-axis direction from viewpoint 24. Image 82 shows selected display object 90 in its position coupled to viewpoint 24 at the time it was selected for transporting, while display objects 20 and 22 are perceived as viewed from the new viewpoint into workspace 10, thus showing that selected display object 90 is a copy of display object 20. Selected display object 90 may be transported to another position within workspace 10, or to a second workspace, according to the steps previously described, and display object 20 will remain in its original position in workspace 10.

C. An implementation.

An embodiment of the present invention has been implemented as part of a software system known as the "Information Visualizer" on a Silicon Graphics 4D/440 VGX computer running the Irix operating system, available from Silicon Graphics, of Mountain View, Calif. It runs on all current Silicon Graphics platforms which offer the Iris GL graphics library from Silicon Graphics. The software system is written in a standard version of the Franz Allegro Common Lisp programming language in conjunction with the Iris GL graphics library, using a compiler and interpreter available from Franz, Inc. of Berkeley, Calif. It will be apparent to those of skill in the art from the following description of the illustrated implementation that a wide variety of programming languages and hardware configurations could readily be used in place of those in the illustrated embodiment based on the description herein without departing from the scope and intended utility of the present invention.

1. The system.

Figure 21:
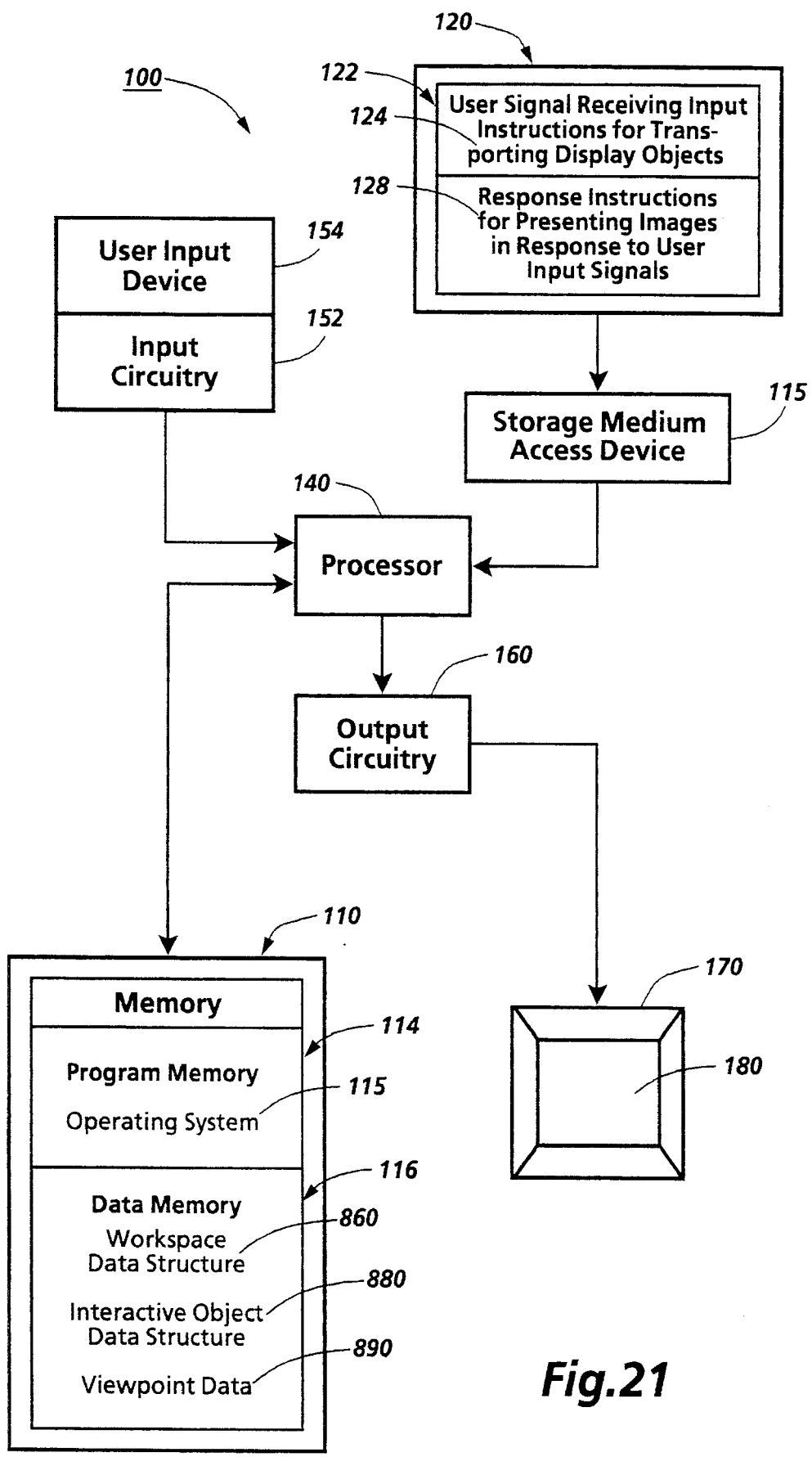
FIG. 21 is a simplified block diagram illustrating the system environment in which the present invention may be used, the system configuration of the system of the present invention, and the software product of the present invention.

FIG. 21 shows components of a processor-controlled system 100 implementing the present invention. System 100 includes input circuitry 152 for receiving user signals from user input device 154 indicating actions or requests by a system user. A user signal may include a request for an operation and information identifying the requested operation, wherein the signal or signals indicate one or more actions by a system user intended to cause performance of the operation. An operation is performed by the system "in response" to one or more user signals when the signals received are for indicating a valid request for a valid operation and for causing the operation to be performed. Signals indicating a single complete request or action may include a combination of any number of signals indicating a valid request for a valid operation and for causing the operation to be performed. Signals indicating user actions may also include signals indicating the selection or movement of a display object visible to the user in display area 180, signals indicating requests that result in operations being performed by processor 140, and signals that result in processor 140 presenting an image for display in display area 180.

User input device 154 includes a keyboard and a mouse in the present implementation. User input device 154, however, may include any one of a variety of input devices controllable by a user that produces signals of the type needed by the present invention. Suitable input devices include, but are not limited to pointing devices, such as a stylus, pen, and trackball. The user input device has circuitry (not shown) for controlling the interaction between the system user and display features and objects presented on display device 170. For example, the pointing device may have buttons (not shown) which when clicked or released result in signals being sent through input circuitry 152. In the case of a pen-like or stylus device that can be moved over the display surface display area 180, there may be a pressure sensitive tip switch (not shown) which results in signals being sent through input circuitry 152 when the user presses the tip switch against display area 180, such as, for example, when the system user uses the stylus to make gestures in display area 180. The method of the present invention may be implemented in a manner to receive signals indicating a display request from any of these user input devices.

Processor 140 is connected for accessing program memory 114 of memory 110 to retrieve instructions, which it then executes. Processor 140 is also connected for accessing data memory 116 in addition to receiving input signals from input circuitry 152, and providing data defining images, for example, the images shown in FIGS. 2, 3 or 4, to output circuitry 160 for presentation on display device 170 in display area 180. Program memory 114 stores operating system instructions 115, and stores the instruction data indicating the instructions for operating system 100 according to the present invention. Data memory 116 stores workspace data structure 860, interactive object data structures 880, and viewpoint data 890.

2. Overview of processing environment.

The Information Visualizer system is a real-time 3D graphics animation system providing plural, simulated 3D, navigable workspaces for user interaction. One important application of the system is to provide effective visualizations of a large corpus of information, such as from a large data base, which can be termed a "large information space." Thus, a workspace visualization of a large information space may contain many objects that each may be highly detailed or complex in nature. A system user is permitted to interact with the visualized information objects by navigating in the workspace in order to orient a view into the workspace that provides the most effective access to desired information. An animation loop routine controls the presentation of images to a user during an interactive session. The "animation loop" is a repeated operation in which each repetition presents an image and in which objects and other display features in each image appear to be continuations of objects and display features in the next preceding image. If the user is providing signals through a user input means, the signals can be queued as events and each loop can handle some events from the queue. An "animation cycle" is a single iteration of an animation loop. In response to an appropriate call, processor 140 (FIG. 21) executes the animation loop routine, which includes a loop that continues until terminated by an appropriate signal from user input device 154. Each animation cycle of the loop can use double buffer techniques to present a respective image on display 170, with the respective images together forming a sequence such that display features in each image appear to be continuations of display features in the previous image in accordance with object constancy techniques. A brief description of the animation loop is useful in understanding the implementation of the present invention.

Each animation cycle includes a call to input handling subroutines to receive and handle the next item on a FIFO event queue maintained by operating system 115. The event queue includes signals from the user such as keystrokes, mouse events, and mouse pointer movements, and can also include events from other sources such as from another process. Each animation cycle also includes a call to viewpoint motion subroutines to determine the current position of the viewpoint. Then the animation cycle calls 3D workspace subroutines to redraw the three-dimensional workspace. In redrawing the workspace, the 3D workspace subroutines call object drawing routines to redraw each object in the workspace. Additional information about the software system known as the Information Visualizer may be obtained from the Robertson article, cited earlier, and in Card., S., Robertson, G., and Mackinlay, J., "The Information Visualizer, An Information Workspace,", *Proceedings of SIGCHI '91*, 1991, pp. 181–188, which are both hereby incorporated by reference herein, and from additional articles cited therein. Viewpoint motion in a workspace may be accomplished by a variety of techniques, both manual and automated. One technique, called point of interest motion, is described in commonly assigned U.S. Pat. No. 5,276,785 issued to Mackinlay et al. and entitled "Moving Viewpoint with Respect to a Target in a Three Dimensional Workspace," and in the Mackinlay article cited earlier, which are both hereby incorporated by reference herein.

3. Data structures.

Operation of the present invention involves changes to the data structures that provide a model of each workspace and its contents. Data memory 116 (FIG. 21) includes 3D workspace data structure 860, interactive object data structure 880, and viewpoint data 890, as well as other data stored and accessed during execution of instructions in program memory 114. 3D workspace data structure 860 can include a list of objects in the workspace and data indicating the extent of the workspace. Each display object included in an image that is a view into a workspace represents an object known as an Interactive Object. Workspaces themselves are Interactive Objects, as are individual display features included in workspaces, such as walls and doors. An Interactive Object may itself be composed of other Interactive Objects, or may be an object that is itself included in another Interactive Object. Each Interactive Object is represented by a data structure 880 which includes information about the workspace it is in, other Interactive Objects that it may be composed of, type data indicating its geometric shape or other visual attributes of the object when it is rendered, coordinate data indicating its absolute position within the workspace, a list of other objects that are attached to the object, if any, and various properties that control behavior of the object, including whether it can be selected for manipulation by the user, and, if so, how it behaves when selected. Data memory 116 also includes various data items that store transitional or parameter data needed to perform the various functions of the system. Table 1 below lists and describes the data items that are specifically utilized in conjunction with the illustrated implementation of the present invention. The term "pocket" is used in Table 1, and hereafter in the description, as a metaphor for the operation of transporting (moving or copying) a display object. The term "gaze" is used hereafter as a general term for viewpoint in the data names "tied-to-gaze" and "direction-of-gaze."

TABLE 1

| Data Item /Property | Description and Use/Values |
| --- | --- |
| in-pocket | object property that tracks whether an object is currently pocketed; Values: on/off toggle. |
| non-zbuffer | object property that tracks whether object zbuffering should be ignored; used in animation loop rendering routine to render last the objects with this property "ON" so that they are not obscured by other objects in the workspace; Values: on/off toggle. |
| tied-to-gaze | object property that tracks whether an object is coupled to a viewpoint; Values: on/off toggle. |
| *N-Objects-Tied-To-Gaze* | a count of the objects that are coupled to a viewpoint; used for efficiency; e.g., to determine whether object positions need to be recomputed after a change of viewpoint; Values: integer. |
| saved viewpoint data; saved "dog" data | a viewpoint comprises two data items: the x,y,z coordinate position of the viewing point into the workspace, also called the "eye"; and the x,y,z coordinate position of the line of sight into the workspace, also known as the direction of orientation, or direction of gaze (abbreviated as "dog"). |

TABLE 1-continued

| Data Item /Property | Description and Use/Values |
| --- | --- |
| non-zbuffer-count | a count of the objects that have the non-zbuffer property ON; used for efficiency during each animation cycle to draw non-zbuffered objects last; Values: integer. |

4. Input event handling and pocketing a display object for transporting.

Figure 22:
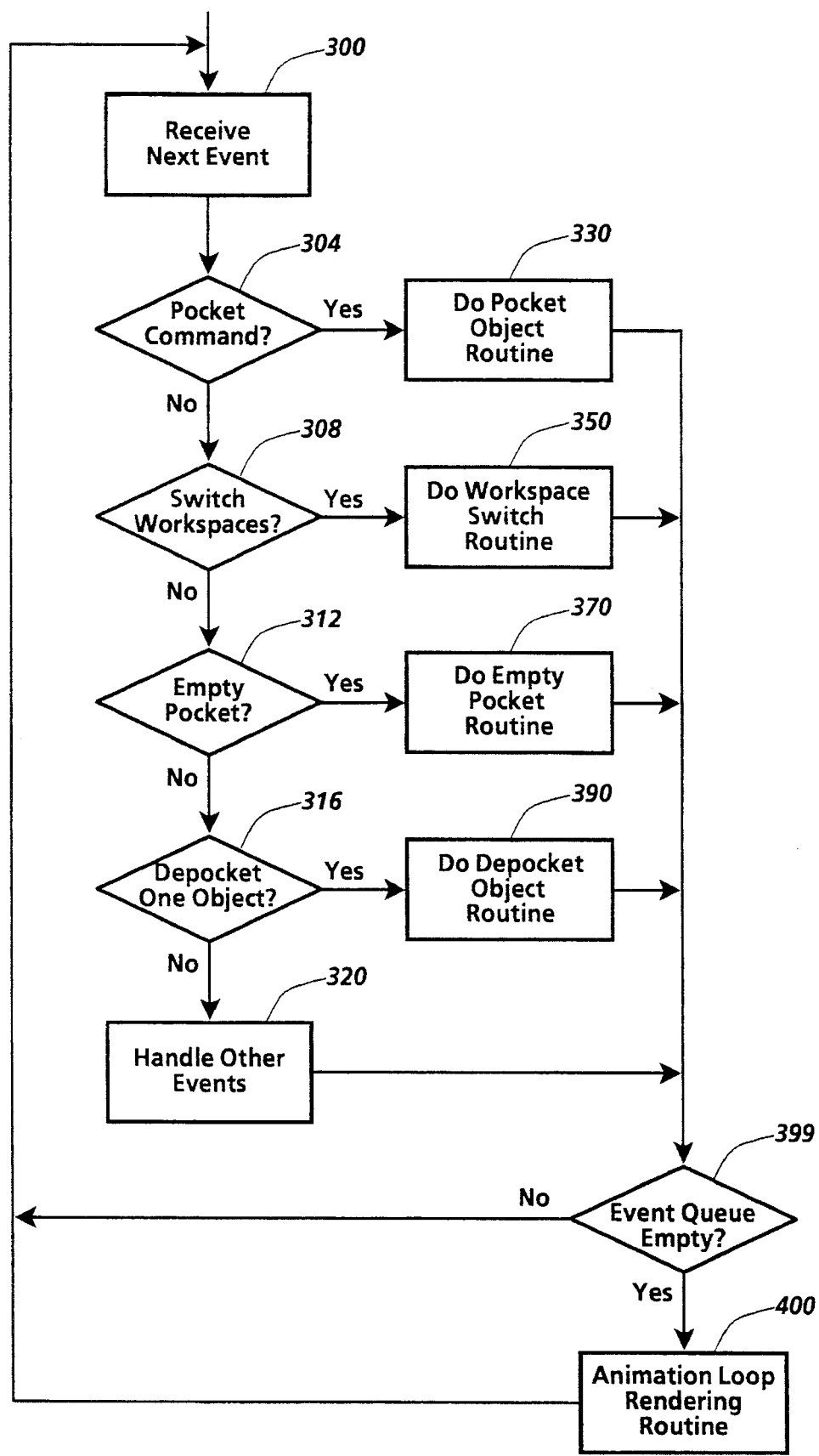
FIG. 22 is a flow chart illustrating the animation loop as it relates to input events for transporting a display object between workspaces according to an implementation of the present invention.

The steps of the illustrated implementation are shown in the flowcharts of FIGS. 22–28 as they relate to transporting a selected display object from a first workspace to a second workspace. The flowchart in FIG. 22 provides an overview of the animation loop as it relates specifically to input events for transporting, or "pocketing", a display object between workspaces. The flowchart in FIG. 22 indicates that, upon execution of event handling routines, such as selecting an object for transporting (Pocket Object routine 330), and after all events in the event queue have been handled, via the test in box 399, control passes to animation loop rendering routine 400, which draws the 3D workspace. However, it is more precise to describe the animation loop as continuously executing in order to provide the perception of animated movement to the user while the user's cursor is positioned in the workspace. For example, in this implementation, animation loop rendering routine 400 is called approximately 30 times per second. Changes that have occurred to objects and to the viewpoint as a result of events handled between these calls will be presented in the next iteration of animation loop rendering routine 400.

With continued reference to FIG. 22, step 300 receives the next input event from the event queue. Input event processing includes testing for whether a pocket command has been received, in box 304. If so, control is transferred to step 330, a routine for pocketing objects, illustrated in more detail in FIG. 23. If the input event is not a pocket command, input event processing further includes testing for whether a switch workspace command has been received, in box 308. If so, control is transferred to step 350, a routine for presenting a new workspace, illustrated in more detail in FIG. 27. If the input event is not a switch workspace command, input event processing further includes testing for whether an end-of-transport command, called an empty pocket command, has been received, in box 312. If so, control is transferred to step 370, a routine that ends the transport operation and decouples the selected display objects from the viewpoint, illustrated in more detail in FIG. 24. In this implementation, a system user may transport multiple display objects between workspaces, and then, in the second workspace, may decouple all of them from the viewpoint at one time, using the empty-pocket command, or alternatively may decouple them one at a time. Input event processing further includes testing for whether an end-of-transport command for a single selected display object, called a depocket-one-object command, has been received, in box 316. If so, control is transferred to step 390, a routine that decouples a single selected display object from the viewpoint, illustrated in more detail in FIG. 26. If none of these events has been received, the input event is another type of input event and is handled by step 320.

5. Object transport selection and termination operations.

Figure 23:
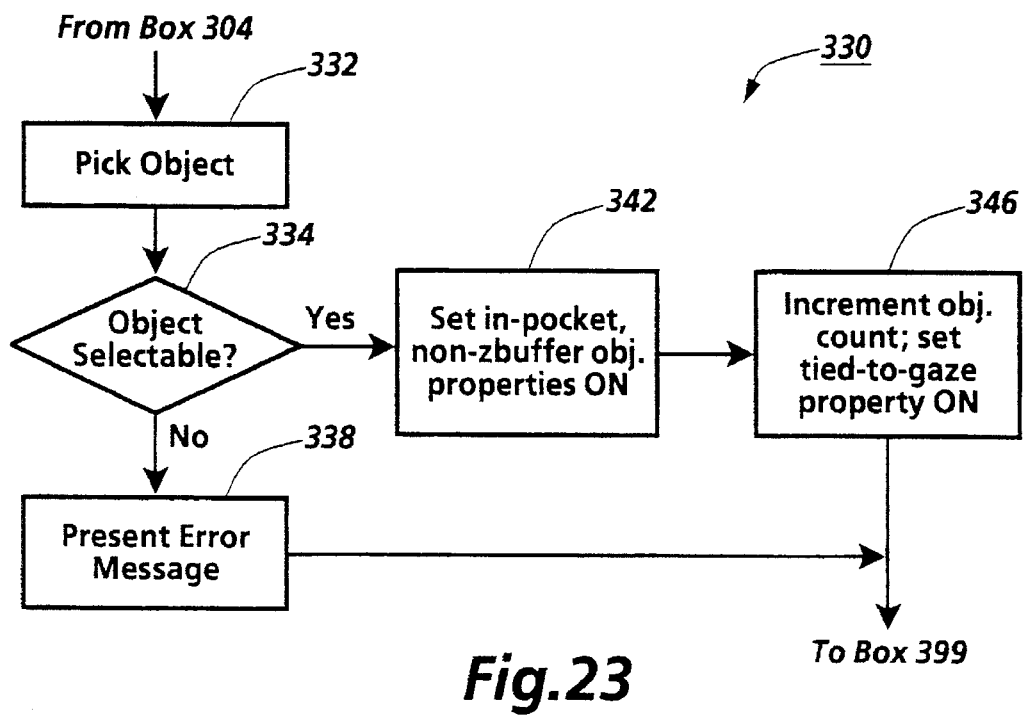
FIG. 23 is a flow chart illustrating a routine for initiating transport of an object, according to an implementation of the present invention.

When a signal indicating an object transport operation is received, control is transferred to routine 330 (called the Pocket Object routine), illustrated in FIG. 23. In the illustrated implementation, the object transport signal may be the result of selection of a menu item, such as a "move" or "copy", or may be a combination of keyboard keys, such as alt-p and alt-c. Step 332 executes a "pick-object" routine which provides a displayed cursor, such as the cursor illustrated in FIG. 4, in the image for the user to use to select an object for transporting. The pick-object routine determines which object in the workspace the user selects, and returns the selected object. The query in box 334 tests whether the object is allowed to be transported. In this implementation, for example, wall and door objects in a workspace may not be transported. Other objects, of course, may also be made unavailable for transporting. The step in box 338 presents an error message if an unavailable display object is selected, and the user must enter the transport command again to select another object. If a properly available object has been selected, the steps in boxes 342 and 346 set the in-pocket, non-zbuffered, and tied-to-gaze object properties ON, and increment the "N-Objects-Tied-To-Gaze" count (hereafter, also called the "object count").

Figure 24:
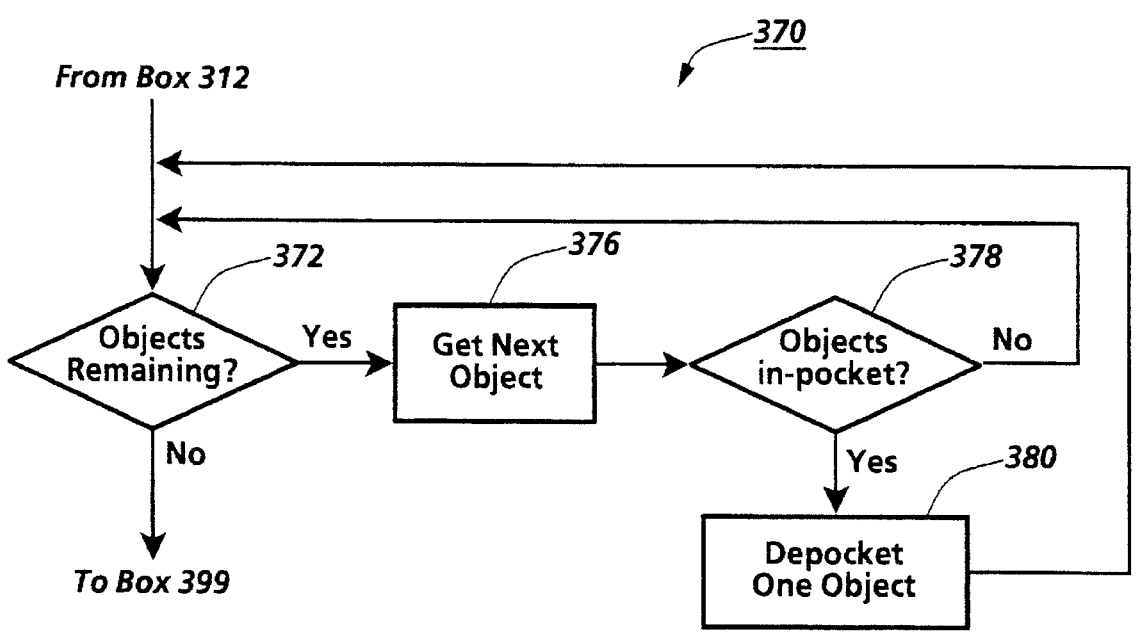
FIG. 24 is a flow chart illustrating a routine for terminating the transport operation and decoupling all selected display objects from the viewpoint, according to an implementation of the present invention.

A user may signal an object transport termination operation in one of two ways: by either terminating the transport of all currently transported objects by means of selecting a menu command, such as "empty pocket," or entering keyboard combination alt-e; or, by terminating the transport of one of the transported objects by selecting the menu command, "depocket an object." When the user signals terminating the transport of all currently transported objects, control is transferred to routine 337 (called the Empty Pocket routine), illustrated in FIG. 24. When the user signals terminating the transport of one transported object, control is transferred to routine 390 (called the DePocket Object routine), illustrated in FIG. 26. Both routines make use of routine 380, illustrated in FIG. 25, which updates the object's properties to indicate that an object is no longer selected for transporting.

Figure 25:
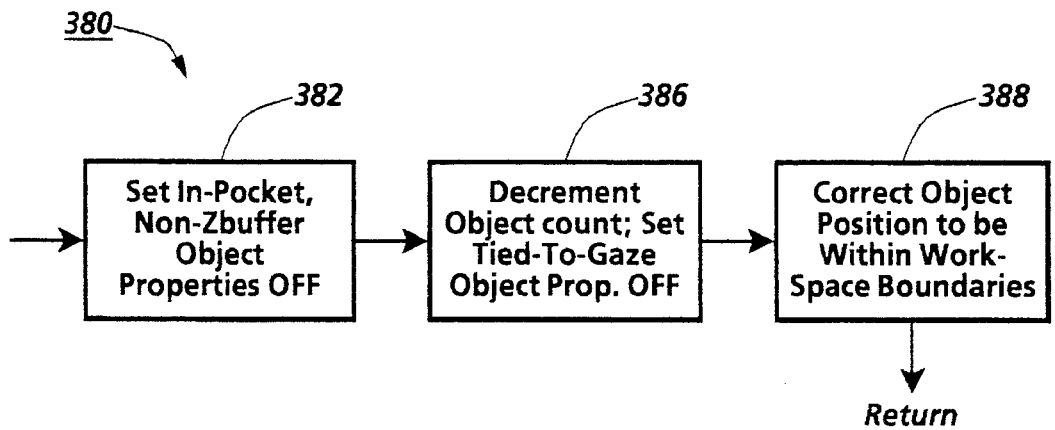
FIG. 25 is a flow chart illustrating the steps of routine 380 of FIGS. 24 and 26 for decoupling a single display object from the viewpoint according to an implementation of the present invention.
Figure 26:
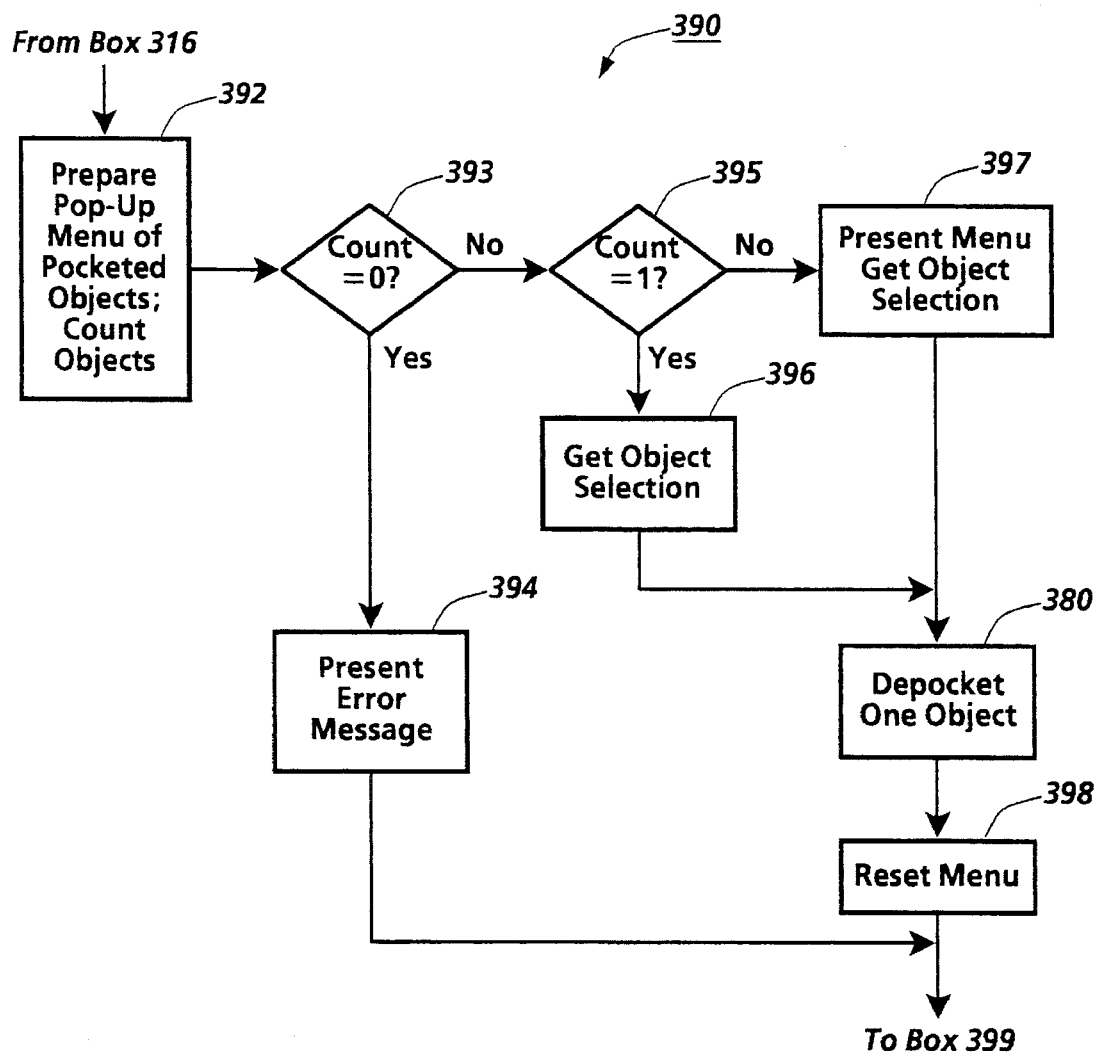
FIG. 26 is a flow chart illustrating a routine for terminating the transport operation for a single selected display object, according to an implementation of the present invention.

Empty pocket routine 370 (FIG. 24) implements a loop through the array of interactive objects included in the workspace to find objects having the in-pocket property ON. For each such object, routine 380, shown in FIG. 25, is executed. The step in box 382 of FIG. 25 sets the in-pocket and non-zbuffer object properties to OFF. Next, the step in box 386 decrements the object count, and sets the tied-to-gaze property to OFF. Then, the step in box 388 determines the workspace boundaries of the current workspace and determines if the object has a valid position within the boundary. As a result of changing workspaces, the position of an object selected for transporting may not be within the boundaries of the new workspace. Step 388 adjusts the object position to place the object immediately inside a workspace, if necessary.

DePocket Object routine 390 (FIG. 26) includes step 392, which loops through the array of interactive objects included in the workspace to find objects having the in-pocket property ON, and adds the titles of these objects to a pop-up menu. For efficiency, step 392 also counts the objects found having the in-pocket property ON, and uses this count to facilitate further processing in selecting an object for "depocketing," as shown in steps 393, 394, 395 and 396. If the object count is greater than 1, a routine for handling pop-up menus presents the pop-up menu and gets the user's selection of an object from the menu. For the selected object, routine 380, shown in FIG. 25, is executed as described above.

6. Workspace switching, updating the workspace data structures and changing transported object positions.

Figure 27:
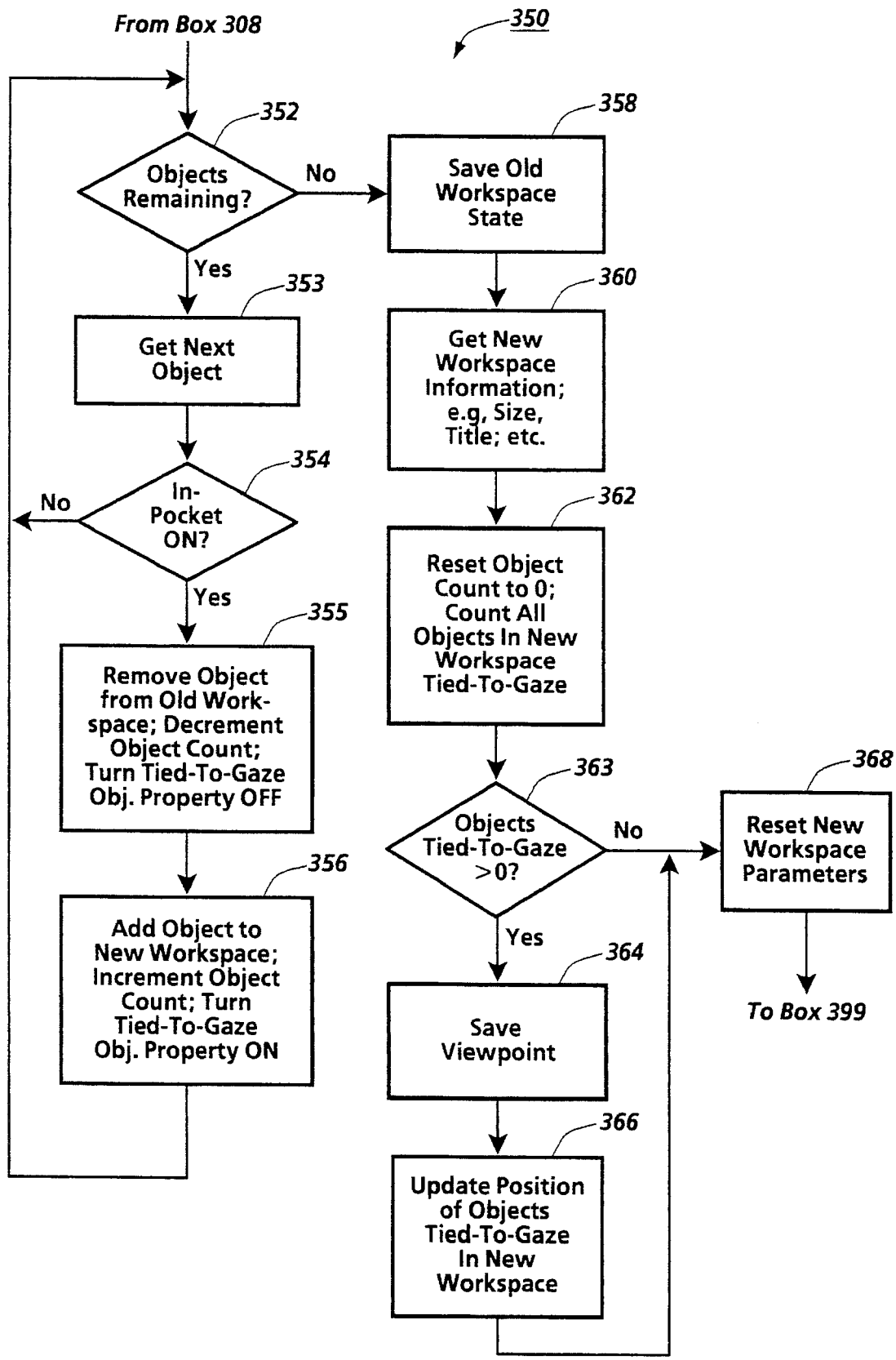
FIG. 27 is a flow chart illustrating a routine for presenting a new workspace, according to an implementation of the present invention.

The system user may use the transport operation to move or copy display objects from one workspace to another. When the user signals a workspace switch, control is transferred to routine 350, which handles all of the necessary data structure and transition data updates in preparation for the animation loop rendering routine 400 to call drawing routines for drawing the new workspace. Routine 350 illustrated in FIG. 27 shows the steps that pertain primarily to the handling of transported objects during a workspace switch. Other workspace functions are either omitted or only referenced in general terms. For reference purposes during the description of this routine, and for other routines, once a workspace switch has been initiated, the workspace being exited, and which will be the workspace currently displayed until a draw workspace routine is executed, is considered the "old" or "prior" workspace, while the workspace to be entered will be considered the "new" or "current" workspace. Routine 350, in the steps shown in boxes 352, 354, 355, and 356, implements a loop through the array of interactive objects contained in the old workspace, and for each object having the in-pocket object property ON, step 355 removes the object from the old workspace, decrements the object count tracking the objects being transported, and sets the tied-to-gaze object property to OFF. Then, step 356 adds the object to the new workspace, increments the object count, and sets the tied-to-gaze object property to ON. Adding and removing objects from a workspace may be accomplished in a number of ways. For a moved object, the actual object data structure may be deleted from the old workspace, and a copy of the object data structure may be added to the new workspace. Or an object may have a property that determines whether it is included in or deleted from a workspace. In the implementation described herein, an object has a property that indicates whether it is included in a workspace; the routine for removing objects from a workspace modifies the object's property to indicate that the object is no longer included in the workspace. Adding the object to a different workspace modifies the object property to indicate that it is included in the workspace.

A change in workspaces also results in certain state information about the old workspace being saved, so that it can be restored when the user returns to the workspace. Step 358 accomplishes this. Step 360 performs functions related to the state conditions of the new workspace; for example, size information of the workspace is retrieved in preparation for drawing the workspace.

Steps 363, 364, 365, and 366 are preparatory steps for the presentation in the new workspace of objects that are being transported. An object being transported is presented in an image as being in the relationship to the viewpoint and orientation that it was in at the time it was selected for transporting. This feature may be implemented in a number of ways. In the implementation described herein, each change in viewpoint from a prior viewpoint and orientation to a new viewpoint and orientation results in updating the position and orientation in the workspace of each transported object by applying the difference in position and orientation between the prior viewpoint and orientation and the new viewpoint and orientation to each object's respective position and orientation. This object position and orientation updating function is represented in step 366 in FIGS. 27 and 28, and sample source code from the illustrated implementation for this position updating operation is included in the Appendix immediately following this description. Viewpoint and orientation changes may occur in any of the three dimensions. Typically, a user will change the viewpoint by rotation about the y-axis, that is, look to the left or right in the workspace. In such a case, the x and z positions and y-axis orientation of the object in the workspace would be adjusted to reflect the change in order to maintain the coupling of the transported display object to the viewpoint. Or the user may change position in the z-axis and/or x-axis, that is, move forward or backward in the workspace. In this case, the x and z positions of the object in the workspace would be adjusted to reflect the change in order to maintain object coupling to the viewpoint. A user might also move the viewpoint along the y-axis, that is, move up or down. In this case, the y position of the object in the workspace would be adjusted to reflect the change in order to maintain object coupling to the viewpoint. A less frequent and possibly more disorienting type of movement is rotation about the x-axis, that is, looking up or down in the workspace. Such a change would require adjustments to the y and z positions and x-axis orientation of the coupled display object. In the code of the illustrated implementation in the Appendix, a new transported display object position and orientation in the workspace is calculated for each viewpoint change rotating about the y-axis, and translating along the x-axis, y-axis, and/or z-axis, but changes in viewpoint involving rotations about the x-axis are treated as special cases and generalized as rotations about the y-axis only. Thus, in the very rare case that the change in viewpoint is exclusively a change in direction of gaze in the workspace rotated about the x-axis only, the code in the Appendix would result in making inadequate position adjustments to the transported object's position and orientation in the workspace. This is an implementation decision, and such adjustments for x-axis rotation viewpoint changes to a transported display object's position and orientation could be made in another implementation. It is also conceivable that a user might want to rotate the viewpoint around the z-axis (which would appear like tilting the head to the left or right). In that case, transported objects would have their x and y positions and z-axis orientation adjusted. The code in the Appendix does not handle rotation of the viewpoint around the z-axis. This is also an implementation decision, and such adjustments for z-axis rotation viewpoint changes to a transported display object's position and orientation could be made in another implementation.

Step 362 initializes to zero the object count tracking the objects being transported, and then searches the objects that are contained in the new workspace to locate and count the objects having the tied-to-gaze property set to ON. Step 363 then tests whether the object count is greater than zero (i.e., whether there are any objects contained in the new workspace that have the object property tied-to-gaze set ON.) If so, the viewpoint into the old workspace is saved, in step 364, and the position in the new workspace of each transported object is updated in step 366. Step 368 performs other functions associated with resetting parameters and other preparatory steps prior to drawing the new workspace.

The technique in the illustrated implementation easily supports the transporting of display objects where each display object is selected for transporting from a different viewpoint into the workspace, since the technique adjusts the position and orientation of display objects selected for transporting based on applying to each display object the incremental differences in position and orientation between a prior viewpoint and a new viewpoint, and does not depend on storing and performing computations on each actual viewpoint at the time of selection and during transporting.

7. Animation cycle rendering.

Figure 28:
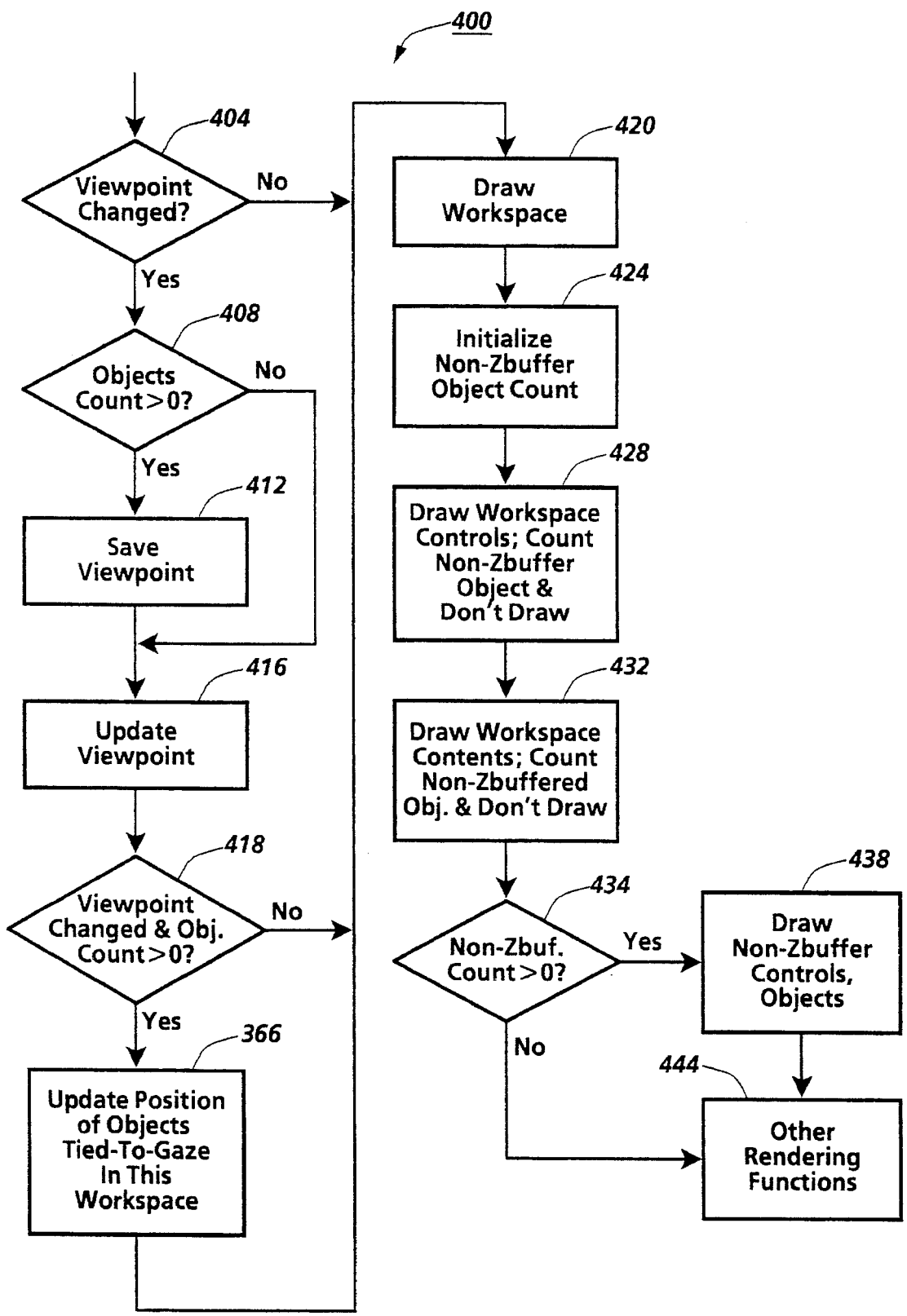
FIG. 28 is a flow chart illustrating the animation loop rendering routine for drawing the workspace, according to an implementation of the present invention.

Rendering routine 400 checks several parameters indicating the type of movement being performed, and then calls routines for drawing the workspace, the workspace controls and the contents of the workspace. The flowchart in FIG. 28 illustrates the general functions and flow of control of rendering routine 400, with emphasis on the functions related to transporting objects. Step 404 tests whether the viewpoint into the workspace has changed. If it hasn't, the view of objects in the workspace has not changed, no object translation, rotation, or scaling is needed, and no position updating is needed for objects being transported; control is transferred to the drawing routines, beginning with step 420. If the viewpoint has changed, step 408 tests whether there are any objects in the workspace having the object property tied-to-gaze ON. If there is, step 412 saves the current viewpoint (the viewpoint from which the workspace is currently being viewed, prior to receipt of the new viewpoint), and then step 416 updates the viewpoint with the new viewpoint information. If there are no objects having the object property tied-to-gaze ON, prior viewpoint information is not needed, and control transfers to step 416 for updating the viewpoint with the new viewpoint information.

With continued reference to FIG. 28, step 418 tests both of these factors together; when both the viewpoint has changed and the object count of objects tied-to-gaze is greater than zero, step 366, the object position updating function, updates the position and orientation in the workspace of all transported objects by applying the difference in position and orientation between the prior viewpoint and orientation and the new viewpoint and orientation to the position and orientation of each transported object. As noted earlier, source code showing an implementation of step 366 is included in the Appendix.

The actual drawing routines make up the remainder of the functions in rendering routine 400. The step in box 420 draws the workspace. With respect to objects in the workspace, if any objects are being transported, then they are preferably to appear as though they are in front of, and not overlapped or obscured by, other objects in the workspace. The remaining steps in rendering routine 400 accomplish this by testing for and counting the objects having object property non-zbuffered set to ON, and then drawing those objects last. Step 424 initializes the count of the non-zbuffered objects in the workspace. Step 428 access object data structures for a class of objects known as workspace controls, counts the workspace control objects having the non-zbuffered property set to ON, doesn't draw those, and draws the workspace control objects having the non-zbuffered property set to OFF. Similarly, with the remaining classes of objects in the workspace, step 432 access the object data structures, counts the objects having the non-zbuffered property set to ON, doesn't draw those, and draws the objects having the non-zbuffered property set to OFF. Step 434 tests whether the non-zbuffered object count is greater than zero, and if so, control is transferred to step 438 where all objects having the non-zbuffered property set to ON are drawn in the workspace. Remaining rendering functions are handled in box 444.

Since routine 366 for updating the position of selected display objects being transported is called during each execution of animation loop rendering routine 400, regardless of whether a workspace switch occurs, it can be seen that present invention easily supports the transporting of display objects within a single workspace, as well as between workspaces.

D. The system configuration and software product of the present invention.

The system configuration of the present invention is shown in FIG. 21. Processor 140 may be operated according to the general steps shown in FIG. 20, and specifically according to the illustrated implementation shown in FIGS. 22–28, creating, storing and manipulating the data structures in data memory 116. The actual manner in which the physical hardware components of system 100 are connected may vary, and may include hardwired physical connections between some or all of the components, connections over wired or wireless communications facilities, such as through remote or local communications networks and infrared and radio connections. For example, output circuitry 160, input circuitry 152 and display 170 may be physically embodied in one device 150, such as in flat tablet display having an attached stylus as user input device 154. Memory 110 may include memory that is physically connected to processor 140 as local memory, or that is remotely accessible to processor 140 by means of a wired or wireless communications facility. Thus, when it is described below that the method causes processor 140 to access a particular data item, that data item may be stored in a memory device that is remotely located from system 100 but which is accessible to processor 140 by means of the appropriate connections. It is further of importance to note that the range of the physical size of system 100 may include a small desktop, laptop, or pocket-sized or smaller device to larger more conventionally sized systems such as those including personal computers or workstations, or even to large electronic whiteboard applications. It is intended that a system carrying out the present invention include all systems in this physical size range.

FIG. 21 also shows software product 120, an article of manufacture that can be used in a system that includes components like those shown in FIG. 21. Software product 120 includes data storage medium 122 that can be accessed by storage medium access device 115. Data Storage medium 122 could, for example, be a magnetic medium such as a set of one or more floppy disks, an optical medium such as a set of one or more CD-ROMs, or any other appropriate medium for storing data. Data storage medium 122 stores data 124 and 128 that storage medium access device 115 can provide to processor 140. Stored data 124 and 128 include data indicating user signal receiving input instructions 124, which can be executed to perform steps 220 and 250 in FIG. 20, or step 300 in FIG. 22, for receiving user signals relating to transporting a selected display object. The stored data also include data indicating response instructions 128, which can be executed to perform steps 240 and 260 in FIG. 20, or routines 330, 350, 370 and 390 in FIG. 22, for presenting images and manipulating data structures in response to the user signals for transporting a selected display object. In addition, stored data in data storage medium 122 may include data indicating viewpoint motion instructions (not shown) for responding to user signals requesting viewpoint motion.

E. Additional aspects of the present invention.

1. Implementations in 2D or 2½D, single or multiple workspaces.

While the object transporting technique of the present invention has been described in terms of an implementation in a 3D, multiple workspace environment, the technique may also be implemented in any 2D or 2½D, single or multiple workspace environment having more than a single, fixed viewpoint into a workspace.

Figure 29:
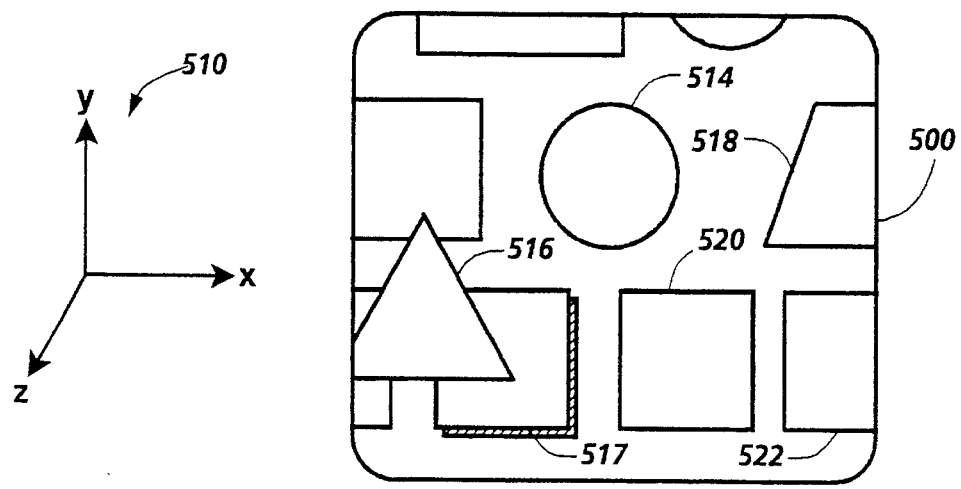
FIGS. 29–34 are a sequence of schematic views of presented images that illustrate viewpoint motion in a 2½D workspace, and illustrate coupling a selected display object to a first viewpoint, according to the steps shown in FIG. 20, and in FIGS. 22–28.

FIG. 29 illustrates image 500 of a view into a 2½D workspace from a first viewpoint in the plus-z direction, oriented as shown by axes 510. The workspace shown in FIG. 29 appears to extend in the plus-y and in both plus- and minus-x directions, as shown for example, by only partially visible objects 516, 518, and 522. Triangular object 516 appears to be in front of object 517, which is shown as having a drop shadow.

Figure 30:
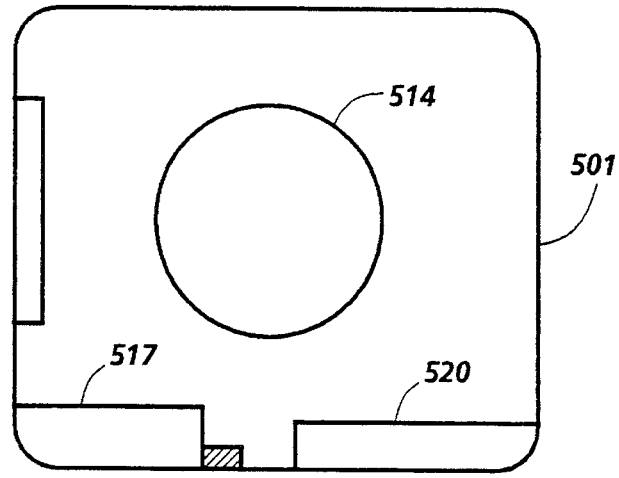

FIG. 30 illustrates image 501 into the same workspace from a second viewpoint, which has moved along the z-axis in the minus-z direction (toward the origin) from the first viewpoint. The user has zoomed in on object 14, and from this second viewpoint, very few of the objects in the workspace are perceptible. The three attributes of display object orientation (rotation, scaling and translation) in a 3D workspace are replaced by the attribute of scale in a 2½D workspace, which controls the perceived appearance of the object's size, proportion or relationship with reference to other objects in the workspace and to the workspace as a whole. The scale of display object 514 has changed in order to provide the perception of motion along the z-axis in the workspace.

Figure 31:
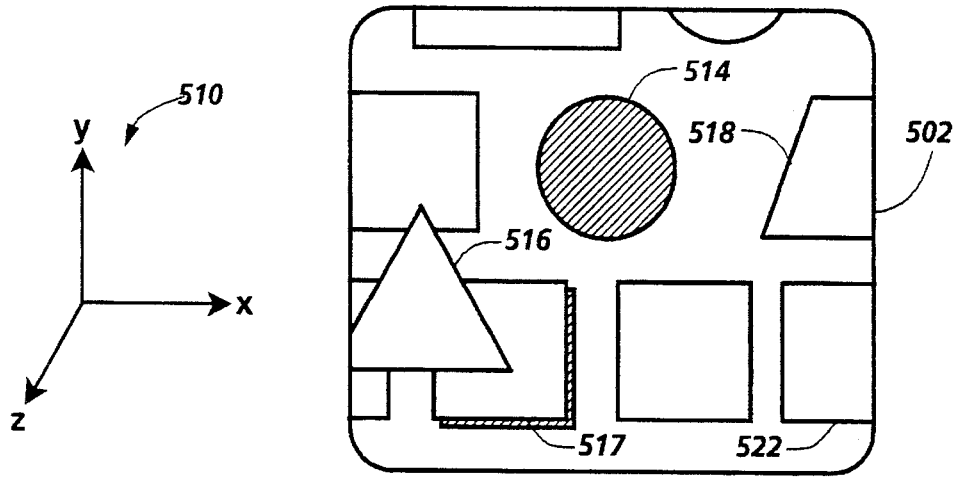

Image 502 in FIG. 31 is the same view into the 2½D workspace from the first viewpoint as that of image 500. Circular display object 514, which appears with cross-hatching indicating highlighting, has been selected for transporting according to the present invention. Circular display object 514 will remain coupled to the first viewpoint while it is being transported, during subsequent user navigation around the workspace.

Figure 32:
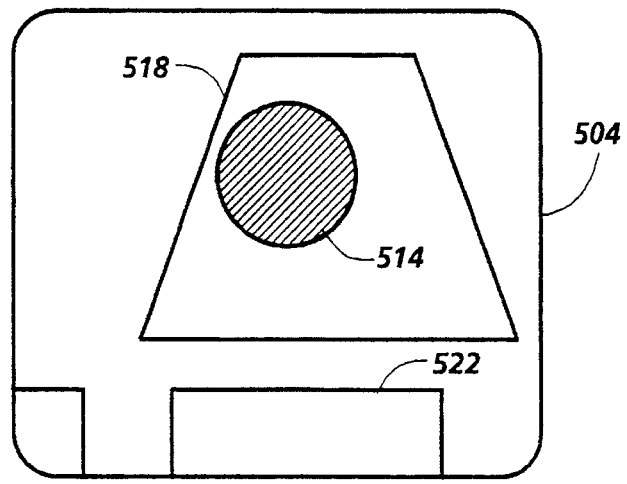
Figure 33:
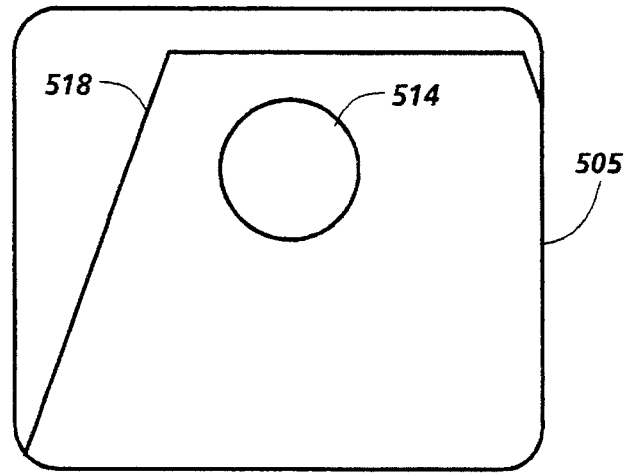
Figure 34:
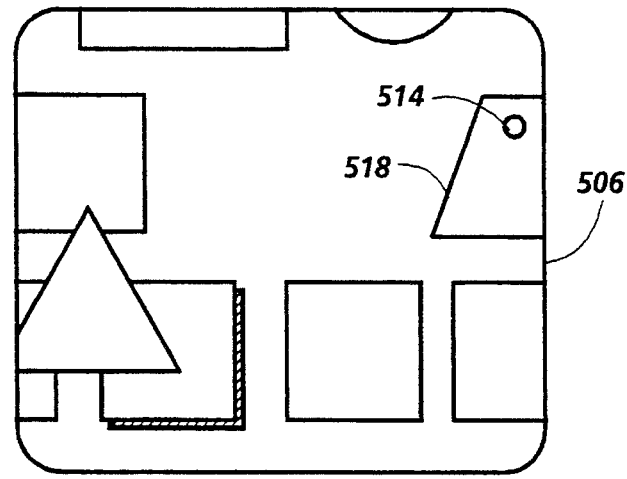

FIG. 32 illustrates image 504 into the same workspace from a third viewpoint, which has moved along the plus-x axis from the first viewpoint to the right in the workspace to bring object 518 into full view, and along the z-axis in the minus-z direction (toward the origin) from the first viewpoint in order to zoom in on object 518. In accordance with the present invention, selected display object 514 has remained in the same position and at the same scale in the workspace as it was when it was selected for transporting in image 502 from the first viewpoint. Similarly, in image 505 in FIG. 33 from a fourth viewpoint further along the z-axis in the minus-z direction into the workspace, selected display object 514 has remained coupled to the first viewpoint. Image 505 shows display object 514 no longer selected; it has been moved into its final position in the workspace, and is no longer coupled to the first viewpoint. FIG. 34 illustrates image 506 into the 2½D workspace from the first viewpoint again, showing display object 514 in its final position within the boundary of display object 518. Since display object 514 is no longer coupled to the first viewpoint, viewpoint motion from the fourth viewpoint of image 505 to the first viewpoint in image 506, along the plus-z direction results in the scale of display object 514 changing in order to maintain the proper relationship to the other objects in the workspace.

Figure 35:
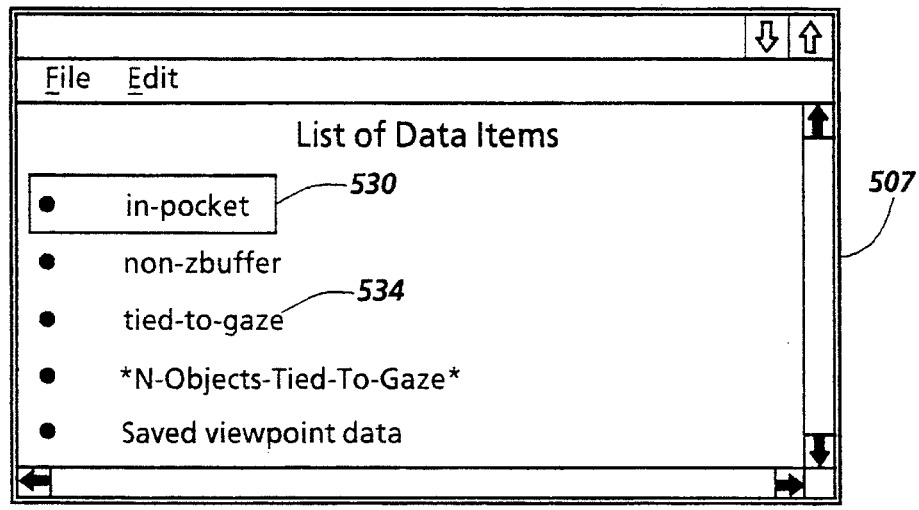
FIGS. 35–37 are a sequence of schematic views of presented images that illustrate viewpoint motion in a scrollable window of a 2D workspace, and illustrate coupling a selected display object to a first viewpoint, according to the steps shown in FIG. 20, and in FIGS. 22–28.
Figure 36:
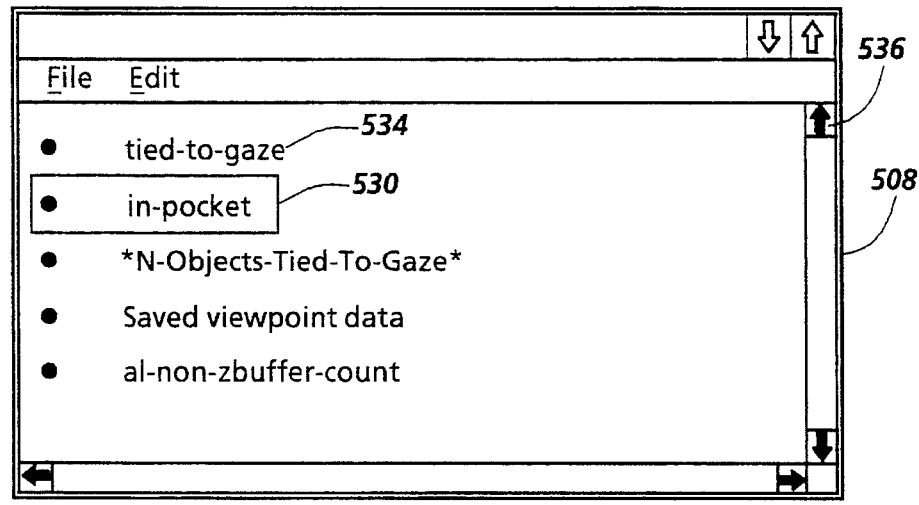
Figure 37:
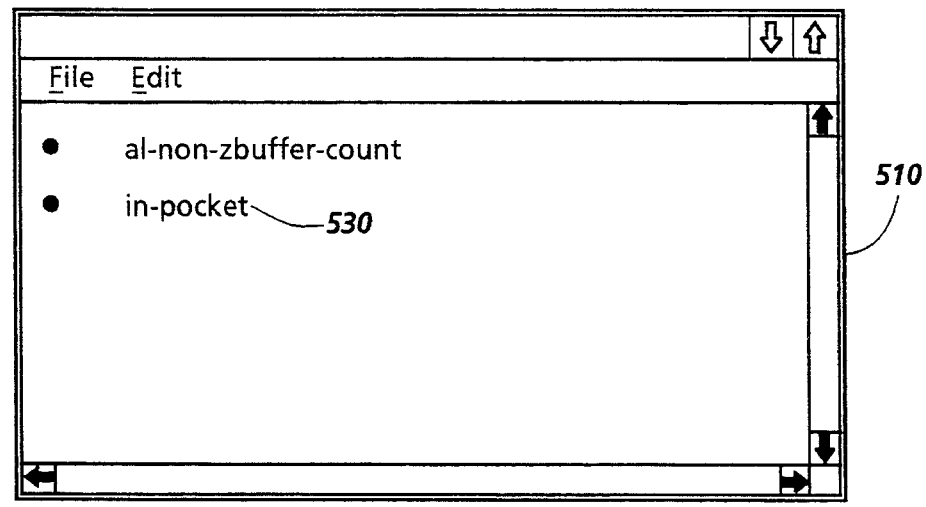

FIGS. 35, 36 and 37 illustrate an application of the present invention to a 2D navigable workspace comprising a navigable (scrollable) window presenting a text editing application. Image 507 in FIG. 35 shows a first viewpoint into a 2D document workspace, at the beginning of a document containing a portion of a list. Item 530, the first item in the list, has been selected for transporting according to the present invention. Item 530 will remain coupled to the first viewpoint, meaning that item 530 will appear to the user to remain in the same x,y coordinate position in the window when the viewpoint is changed by scrolling in either the x or y direction. FIG. 36 shows image 508 from a second viewpoint in the minus-y direction in the document workspace. Highlighted scroll arrow 536 shows the direction of the document text scrolling in the plus-y direction, bringing the remainder of the list into view. Item 534 is now illustrated at the top of the document workspace; item 530, however, has remained coupled to the first viewpoint. As a result, item 530 is in a new position in the document workspace. FIG. 37 shows image 510 from a third viewpoint further in the minus-y direction in the document workspace. Item 530, no longer selected, has been moved to the end of the list, always remaining in full view to the user during the transport operation.

2. Processing efficiency considerations.

The 3D implementation has been described with reference to two viewpoint data items relating to viewpoint position and viewpoint orientation. For example, saved viewpoint data includes prior viewpoint position data and prior viewpoint orientation data. A third aspect of the concept of viewpoint in a 3D workspace is the angle of rotation about the y-axis of the direction of orientation that is exemplified by the user looking to the left or to the right in the workspace. The angle of rotation about the y-axis of the direction of orientation can be computed from viewpoint position data and viewpoint orientation data, so it can either be computed once and stored as a third data item representing a complete description of the viewpoint into the workspace, or it can be computed as needed during processing. In the illustrated implementation, the angle of rotation about the y-axis of the direction of orientation is computed and stored as a data item called "dog-degrees," and saved during a viewpoint change as "saved-dog-degrees." The procedure exemplified by the code included in the Appendix for updating the position and orientation of a selected display object in the workspace in response to a change in viewpoint utilizes this third data element of a workspace viewpoint to improve processing efficiency during the updating procedure.

F. Conclusions.

In summary, the present invention provides an effective method for transporting display objects within an n-dimensional, navigable workspace or between navigable workspaces such that a display object selected for transporting always remains within the view of the system user while it is being transported. This feature eliminates the possibility of the user forgetting what objects are being moved or copied, and reduces the chances of the user becoming disoriented while navigating in the workspace in order to transport an object to a new position. The invention is easy to use and is consistent with other features that support the perception of a large navigable workspace.

It is therefore evident that there has been provided in accordance with the present invention, a method and systems that fully satisfy the aims and advantages hereinbefore set forth. While this invention has been described in conjunction with a specific embodiment thereof, it is evident that many alternatives, modifications and variations will be apparent to those skilled in the art. Accordingly, the invention as herein described is intended to embrace all such alternatives, modifications and variations as fall within the scope of the appended claims.

APPENDIX

Common Lisp source code for updating the workspace position
and orientation of objects being transported; called during each
animation cycle rendering process and during a workspace change

```
;;; Copyright (c) 1989-94 by Xerox Corporations. All rights
reserved.
;; Called during animation cycle and room switch
(defun Update-Object-Tied-To-Gaze (obj)
(let* ((position (io-position obj))
    (orientation (io-orientation obj))
    (delta-angle (i- (dog-degrees) saved-dog-degrees))
    (delta-x 0.0)
    (delta-z 0.0)
    (eye-x (point-x eye))
    (eye-y (point-y eye))
    (eye-z (point-z eye))
    (saved-eye-x (point-x saved-eye))
    (saved-eye-y (point-y saved-eye))
    (saved-eye-z (point-z saved-eye))
    (dog-y (point-y dog))
    (saved-dog-y (point-y saved-dog)))
(declare (fixnum delta-angle)
    (single-float delta-x delta-z
        eye-x eye-y eye-z
        saved-eye-x saved-eye-y saved-eye-z
        dog-y saved-dog-y))
;; Adjust the rotation about Y to match change in gaze orientation
(setf (orientation-y orientation)
(i+ (orientation-y orientation) delta-angle))
;; If gaze is rotated, adjust x and z for rotation
(when(/= delta-angle 0)
(let* ((rx (f- (point-x position) saved-eye-x)) ;; relative x
    (rz (f- (point-z position) saved-eye-z)) ;; relative z
    (old-angle (my-atan (f- 0.0 (point-z saved-dog))
        (point-x saved-dog)))
    (new-angle (my-atan (f- 0.0 (point-z dog))
        (point-x dog)))
    (cos (my-cos (f- new-angle old-angle)))
    (sin (my-sin (f- new-angle old-angle)))
    (newrx 0.0) (newrz 0.0))
    (declare (single-float cos sin
        old-angle new-angle
        newrx newrz
        rx rz newx newz))
    (setq newrx (f+ (f * rx cos) (f * rz sin)))
    (setq newrz (f- (f * rz cos) (f * rx sin)))
    (setq delta-x (f- newrx rx)
        delta-z (f- newrz rz))))
;; Compute new position
(setf (point-x position)
(f+ (point-x position)
    delta-x ;; rotation
    (f- eye-x saved-eye-x))) ;; translation
(setf (point-y position)
(f+ (point-y position)
    (f- dog-y saved-dog-y) ;; rotation (special in y)
    (f- eye-y saved-eye-y))) ;; translation
(setf (point-z position)
(f+ (point-z position)
    delta-z ;; rotation
    (f- eye-z saved-eye-z)))) ;; translation
t)
```

What is claimed:

1. A method of operating a system including a display, a user input device for producing signals indicating actions of a system user, memory for storing data, and a processor connected for receiving signals and for presenting images on the display; the method comprising:

presenting a first image on the display that is perceptible as viewed from a first viewpoint in a first navigable workspace; the first image including a first display object;

receiving a first signal from the user input device indicating a transport request from the system user to transport a selected display object; the first signal further indicating a selection of the first display object as the selected display object;

coupling the selected display object to the first viewpoint in response to the first signal indicating the transport request;

receiving a second signal from the user input device indicating a selection of a second viewpoint by the system user;

presenting a second image including the selected display object on the display in response to the second signal; the second image being perceptible as viewed from the second viewpoint; the selected display object being presented in the second image so that the selected display object is perceptible as being viewed from the first viewpoint;

receiving a third signal from the user input device indicating that transporting the selected display object is completed; and uncoupling the selected display object from the first viewpoint in response to the third signal.

2. The method of claim 1 wherein the first navigable workspace is a three dimensional (3D) navigable workspace, and wherein the first viewpoint includes a first viewpoint position and a first viewpoint orientation in the 3D workspace.

3. The method of claim 1 wherein the first navigable workspace is a three dimensional (3D) navigable workspace, and wherein the first viewpoint includes a first viewpoint position and a first viewpoint scale in the 3D workspace.

4. The method of claim 1 wherein the first navigable workspace is a two dimensional (2D) navigable workspace, and wherein the first viewpoint includes a first viewpoint position in the 2D workspace.

5. The method of claim I further including, after coupling the selected display object to the first viewpoint in response to the first signal indicating the transport request, receiving a plurality of next viewpoint displacement signals requesting viewpoint motion; each viewpoint displacement signal indicating the system user's selection of a next viewpoint displaced from a preceding viewpoint; and presenting on the display, in response to each next viewpoint displacement signal, a respective image including the selected display object; the respective image being perceptible as viewed from the next viewpoint; the selected display object being presented in each respective image so as to be perceptible as viewed from the first viewpoint of the first navigable workspace;

the selected display object being perceptible by the system user during the requested viewpoint motion in each respective image as being coupled to the first viewpoint while the selected display object is being transported.

6. The method of claim 1 wherein the transport request is a request selected by the system user from a plurality of requests including a move object request and a copy object request.

7. The method of claim 1 wherein the step of coupling the selected display object to the first viewpoint includes storing display object coupling data indicating that the selecting display object is coupled to the first viewpoint; and the step of presenting the second image includes
    storing first viewpoint coordinate data indicating the first viewpoint;
    when the display object coupling data indicates that the selected display object is coupled to the first viewpoint, determining an updated display object position in the first navigable workspace for the selected display object using the stored first viewpoint coordinate data and the second viewpoint; and presenting the selected display object in the second image in the updated display object position in the first navigable workspace.

8. The method of claim 7 wherein the selected display object is represented by a first object data structure stored in the memory of the system; the first object data structure including first object absolute position data indicating an original position of the selected display object; and the step of presenting the second image further includes modifying the first object absolute position data to indicate the updated display object position of the selected display object in the second image.

9. The method of claim 8 wherein, when the first navigable workspace is a 3D navigable workspace wherein the first viewpoint includes a first viewpoint position and a first viewpoint orientation, the first object data structure further includes first object absolute orientation data indicating an original orientation of the selected display object; and the step of modifying the first object absolute position data further includes modifying the first object absolute orientation data to indicate an updated display object orientation of the selected display object in the second image.

10. The method of claim 8 wherein, when the first navigable workspace is a 3D navigable workspace wherein the first viewpoint includes a first viewpoint position and a first viewpoint scale, the first object data structure further includes first object absolute scale data indicating an original scale of the selected display object; and the step of modifying the first object absolute position data further includes modifying the first object absolute scale data to indicate an updated display object scale of the selected display object in the second image.

11. The method of claim 1 wherein the second viewpoint selected by the system user is in a second navigable workspace; the second image being presented in the second navigable workspace on the display in response to the second signal.

12. The method of claim 11 wherein the second navigable workspace is represented by a workspace data structure stored in the memory of the system; and the step of presenting the second image of the second navigable workspace further includes modifying the workspace data structure to indicate that the selected display object is included in the second navigable workspace.

13. The method of claim 1 wherein the selected display object presented in the second image includes a selection-highlight display feature indicating to the system user that the selected display object has been selected for transporting; and the selected display object is presented in the third image without the selection-highlight display feature indicating to the system user that the selected display object is no longer selected for transporting.

14. A method of transporting display objects between three-dimensional (3D) navigable workspaces in a system; the system including a user input device for receiving signals indicating actions of a system user; a display device having a display area for presenting images; a processor connected for receiving the signals from the user input device, and connected for providing images to the display device; and memory for storing data; the processor being further connected for accessing the data stored in the memory; the method comprising:

presenting a first image in the display area of the display device that is perceptible as viewed from a first viewpoint and from a first orientation in a first 3D navigable workspace; the first image including a first display object;

receiving a first signal from the user input device indicating a request by the system user to transport a selected display object; the first signal further indicating a selection by the system user of the first display object as the selected display object;

storing display object coupling data indicating that the selected display object is coupled to the first viewpoint and to the first orientation in response to the first signal;

receiving a second signal from the user input device indicating the system user's selection of a second 3D navigable workspace;

responding to the second signal by storing in the system memory first viewpoint coordinate data indicating the first viewpoint and the first orientation; and presenting a second image including the selected display object therein in the second 3D navigable workspace in the display area; the second image being perceptible as viewed from a second viewpoint and from a second orientation in the second 3D navigable workspace; the selected display object being presented using the display object coupling data and the first viewpoint coordinate data so that the selected display object is perceptible in the second image as being viewed from the first viewpoint and from the first orientation of the first 3D navigable workspace;

receiving a third signal from the user input device indicating that transporting the selected display object is completed; and modifying the display object coupling data, in response to the third signal, to indicate that the selected display object is not coupled to the first viewpoint and to the first orientation.

15. The method of claim 14 wherein the request to transport the selected display object is selected by the system user from a plurality of requests including a move object request and a copy object request.

16. The method of claim 14 further including, after storing the display object coupling data indicating that the selected display object is coupled to the first viewpoint and to the first orientation, receiving a plurality of next viewpoint displacement signals requesting viewpoint motion; each viewpoint displacement signal indicating the system user's selection of a next viewpoint and a next orientation displaced from a preceding viewpoint and from a preceding orientation; and presenting in the display area, in response to each next viewpoint displacement signal, a respective image including the selected display object; the respective image being perceptible as viewed from the next viewpoint and the next orientation; the selected display object being presented in each respective image using the display object coupling data and the first viewpoint coordinate data so that the selected display object is perceptible as being viewed from the first viewpoint and from the first orientation of the first 3D navigable workspace;

the selected display object being perceptible by the system user during the requested viewpoint motion in each respective image as being coupled to the first viewpoint and first orientation while the selected display object is being transported.

17. The method of claim 14 wherein the step of presenting the second image further includes determining an updated display object position and an updated display object orientation in the second 3D navigable workspace for the selected display object using the stored first viewpoint coordinate data, the second viewpoint and the second orientation; and presenting the selected display object in the second image in the updated display object position and having the updated display object orientation in the second 3D navigable workspace.

18. The method of claim 14 wherein the step of responding to the second signal indicating the system user's selection of a second 3D navigable workspace further includes modifying a second workspace data structure representing the second 3D navigable workspace to indicate that the selected display object is included in the second 3D navigable workspace.

19. A system comprising:

input circuitry, connected to a user input device, for receiving signals indicating actions and requests of a system user;

output circuitry connected to a display device having a display area for presenting images;

a processor connected for receiving the signals from the input circuitry, and connected for providing images to the output circuitry for presentation by the display device; and memory for storing data; the data stored in the memory including instruction data indicating instructions the processor can execute;

the processor being further connected for accessing the data stored in the memory;

the processor, in executing the instructions, presenting a first image on the display that is perceptible as viewed from a first viewpoint in a first n-dimensional navigable workspace; the first image including a first display object;

the processor, further in executing the instructions, receiving a first signal from the system user to transport a selected display object; the first signal further indicating a selection by the system user of the first display object as the selected display object;

the processor, further in executing the instructions, storing display object coupling data indicating that the selected display object is coupled to the first viewpoint in response to the first signal;

the processor, further in executing the instructions, receiving a second signal from the system user indicating the system user's selection of a second viewpoint; the processor storing first viewpoint coordinate data indicating the first viewpoint;

the processor further, in executing the instructions, responding to the second signal by presenting a second image including the selected display object in the display area; the second image being perceptible as viewed from the second viewpoint; the selected display object being presented in the second image using the display object coupling data, the first viewpoint coordinate data, and the second viewpoint so that the selected display object is perceptible as viewed from the first viewpoint;

the processor further, in executing the instructions, receiving a third signal from the system user indicating that transporting of the selected display object is complete; and the processor, in responding to the third signal, modifying the display object coupling data to indicate that the selected display object is not coupled to the first viewpoint; the selected display object being perceptible to the system user as viewed from the second viewpoint.

20. The system of claim 19 wherein the first n-dimensional navigable workspace is a three dimensional (3D) navigable workspace, and wherein the first viewpoint coordinate data includes first viewpoint position data indicating a position of the first viewpoint in the 3D navigable workspace and first viewpoint orientation data indicating the orientation of the first viewpoint in the 3D navigable workspace.

21. The system of claim 19 wherein the first n-dimensional navigable workspace is a three dimensional (3D) navigable workspace, and wherein the first viewpoint coordinate data includes first viewpoint position data indicating a position of the first viewpoint in the 3D navigable workspace and first viewpoint scale data indicating the scale of the first viewpoint in the 3D navigable workspace.

22. The system of claim 19 wherein the first n-dimensional navigable workspace is a two dimensional (2D) navigable workspace, and wherein the first viewpoint coordinate data includes first viewpoint position data indicating a position of the first viewpoint in the 2D navigable workspace.

23. The system of claim 19 wherein the processor further, in executing the instructions, after storing the display object coupling data indicating that the selected display object is coupled to the first viewpoint, receiving a plurality of next viewpoint displacement signals requesting viewpoint motion; each viewpoint displacement signal indicating the system user's selection of a next viewpoint displaced from a preceding viewpoint; and presenting in the display area, in response to each next viewpoint displacement signal, a respective image including the selected display object; the respective image being perceptible as viewed from the next viewpoint; the selected display object being presented in each respective image using the display object coupling data, the first viewpoint coordinate data and the next viewpoint so that the selected display object is perceptible as being viewed from the first viewpoint of the first n-dimensional navigable workspace;

the selected display object being perceptible by the system user during the requested viewpoint motion in each respective image as being coupled to the first viewpoint while the selected display object is being transported.

24. The system of claim 19 wherein the first signal further includes a signal selected from a move object signal and a copy object signal.

25. The system of claim 19 wherein the processor, in executing the instructions for responding to the second signal, further determines an updated display object position in the first n-dimensional navigable workspace for the selected display object using the stored first viewpoint coordinate data and the second viewpoint; and presents the selected display object in the second image in the updated display object position.

26. The system of claim 25 wherein the selected display object is represented by a first object data structure stored in the memory of the system; the first object data structure including first object absolute position data indicating an original position of the selected display object; and the processor, in executing the instructions for presenting the second image, further modifies the first object absolute position data to indicate the updated display object position of the selected display object in the first n-dimensional navigable workspace.

27. The system of claim 26 wherein, when the first n-dimensional navigable workspace is a 3D navigable workspace wherein the first viewpoint includes a first viewpoint position and a first viewpoint orientation, the processor, in executing the instructions for determining the updated display object position, further determines an updated display object orientation in the 3D navigable workspace for the selected display object using the stored first viewpoint coordinate data and the second viewpoint;

the first object data structure further includes first object absolute orientation data indicating an original orientation of the selected display object; and the processor, in executing the instructions for modifying the first object absolute position data, further modifies the first object absolute orientation data to indicate the updated display object orientation of the selected display object in the second image.

28. The system of claim 26 wherein, when the first n-dimensional navigable workspace is a 3D navigable workspace wherein the first viewpoint includes a first viewpoint position and a first viewpoint scale, the processor, in executing the instructions for determining the updated display object position, further determines an updated display object scale in the 3D navigable workspace for the selected display object using the stored first viewpoint coordinate data and the second viewpoint;

the first object data structure further includes first object absolute scale data indicating an original scale of the selected display object; and the processor, in executing the instructions for modifying the first object absolute position data, further modifies the first object absolute scale data to indicate the updated display object scale of the selected display object in the second image.

29. The system of claim 19 wherein the second viewpoint selected by the system user is in a second navigable workspace; the processor presenting the second image of the second navigable workspace on the display in response to the second signal.

30. The system of claim 29 wherein the second navigable workspace is represented by a workspace data structure, stored in the memory of the system; and the processor, in executing the instructions for responding to the second signal, further modifies the workspace data structure to indicate that the selected display object is included in the second navigable workspace.

31. A method of transporting display objects between three-dimensional (3D) navigable workspaces in a system; the system including a user input device for receiving signals indicating actions and requests of a system user; a display device having a display area for presenting images; a processor connected for receiving the signals from the user input device, and connected for providing images to the display device; and memory for storing data; the processor being further connected for accessing the data stored in the memory; the method comprising:

(a) presenting a first image in the display area of the display device that is perceptible as viewed from a first viewpoint and from a first orientation in a first 3D navigable workspace; the first image including a first display object; the first 3D navigable workspace being represented by a first workspace data structure stored in the system memory indicating that the first display object is included in the first 3D navigable workspace;

(b) receiving a first signal from the user input device indicating a request by the system user to transport a selected display object; the first signal further indicating a selection by the system user of the first display object as the selected display object;

(c) in response to the first signal, modifying a display object coupling data item to indicate that the selected display object is coupled to the first viewpoint and to the first orientation; the selected display object indicating the display object coupling data item;

(d) receiving a second signal from the user input device indicating the system user's selection of a second viewpoint and a second orientation in a second 3D navigable workspace; the second 3D navigable workspace being represented by a second workspace data structure stored in the system memory;

(e) storing in the system memory, in response to the second signal, first viewpoint coordinate data indicating the first viewpoint and the first orientation;

(f) when the display object coupling data item indicates that the selected display object is coupled to the first viewpoint and to the first orientation, determining an updated display object position and an updated display object orientation in the second 3D navigable workspace for the selected display object using the stored first viewpoint coordinate data, the second viewpoint and the second orientation;

(g) presenting a second image of the second 3D navigable workspace in the display area; the second image being perceptible as viewed from the second viewpoint and the second orientation; the second image including the selected display object in the updated display object position and having the updated display object orientation in the second 3D navigable workspace so that the selected display object is perceptible in the second image as being viewed from the first viewpoint and the first orientation of the first 3D navigable workspace;

(h) modifying, in response to the second signal, the first and second workspace data structures to indicate that the first display object is included in the second 3D navigable workspace;

(i) receiving a third signal from the user input device indicating that transporting the selected display object is completed; and (j) in response to the third signal, modifying the display object coupling data item to indicate that the selected display object is not coupled to the first viewpoint and to the first orientation.

32. The method of claim 31 further including, after step (c) of storing the display object coupling data, performing viewpoint motion in the first 3D navigable workspace; the step of performing viewpoint motion including receiving a plurality of next viewpoint displacement signals requesting viewpoint motion; each next viewpoint displacement signal indicating the system user's selection of a next viewpoint and a next orientation in the first 3D navigable workspace displaced from a preceding viewpoint and from a preceding orientation in the first 3D navigable workspace;

storing in the system memory, in response to each next viewpoint displacement signal, prior viewpoint coordinate data indicating the preceding viewpoint and the preceding orientation;

determining an updated display object position and an updated display object orientation in the first 3D navigable workspace for the selected display object using the stored prior viewpoint coordinate data, the next viewpoint and the next orientation; and presenting a next image of the first 3D navigable workspace in the display area; the next image being perceptible as viewed from the next viewpoint and from the next orientation; the next image including the selected display object in the updated display object position and having the updated display object orientation in the first 3D navigable workspace so that the selected display object is perceptible in the next image as being viewed from the first viewpoint and the first orientation of the first 3D navigable workspace.

33. The method of claim 31 further including, after step (c) of storing the display object coupling data, performing viewpoint motion in the second 3D navigable workspace; the step of performing viewpoint motion including receiving, as the second user signal, a plurality of next viewpoint displacement signals requesting viewpoint motion in the second 3D navigable workspace; each viewpoint displacement signal indicating the system user's selection of a next viewpoint and a next orientation displaced from a preceding viewpoint and from a preceding orientation; and repeating steps (e), (f) and (g) in response to each next viewpoint displacement signal; each second image presented being perceptible as viewed from the next viewpoint and the next orientation; the selected display object presented in each second image being perceptible as being viewed from the first viewpoint and from the first orientation of the first 3D navigable workspace.

34. The method of claim 31 wherein the transport request is selected by the system user from a plurality of requests including a move object request and a copy object request.

35. An article of manufacture for use in a system that includes a display having a display area for presenting images to a system user; a user input device for receiving signals indicating actions and requests of the system user; memory for storing data; a storage medium access device for accessing a medium that stores data; and a processor connected for receiving data from the user input device, for providing data defining images to the display, and for accessing the data stored in the memory; the processor further being connected for receiving data from the storage medium access device; the article comprising:

a data storage medium that can be accessed by the storage medium access device when the article is used in the system; and data stored in the data storage medium so that the storage medium access device can provide the stored data to the processor when the article is used in the system; the stored data comprising signal receiving instruction data indicating input instructions the processor can execute to receive signal data from the user input device; the signal data including first, second and third signals for selecting a first display object included in a first image displayed in the display area for transporting to a destination location; the first image being perceptible as viewed from a first viewpoint in a first navigable workspace; and operation performing instruction data indicating response instructions the processor can execute to perform operations in response to the signal data;

when the first signal indicates the system user's selection of the first display object as a selected display object, execution of the response instructions causing the processor to store display object coupling data indicating that the selected display object is coupled to the first viewpoint;

when the second signal indicates the system user's selection of a second viewpoint, execution of the response instructions causing the processor to store first viewpoint coordinate data indicating a position of the first viewpoint in the first workspace, and to present a second image including the selected display object in the display area; the second image being perceptible as viewed from the second viewpoint; the selected display object being presented in the second image using the first viewpoint coordinate data so that the selected display object is perceptible as viewed from the first viewpoint; and when the third signal indicates that transporting the selected display object has been completed, execution of the response instructions causing the processor to modify the display object coupling data to indicate that the selected display object is not coupled to the first viewpoint.

36. In an interactive system including a display device having a display area for presenting graphical images of a navigable workspace, a user interaction device that permits a user to interact with display objects positioned in the workspace and to perform viewpoint motion in the workspace, a processor for executing instructions, and a memory having instructions stored therein indicating instructions the processor executes for producing and presenting the graphical images; each graphical image being perceptible as viewed from one of a plurality of viewpoints in the navigable workspace; the improvement wherein the processor, in executing the instructions in response to a first signal from the system user for transporting a selected display object included in a first graphical image in the workspace, stores display object coupling data indicating that the selected display object is coupled to a first viewpoint in the navigable workspace;

the processor, in executing instructions in response to a second signal indicating selection of a second viewpoint, stores first viewpoint coordinate data indicating the first viewpoint, and presents a second graphical image perceptible as viewed from the second viewpoint; the second graphical image including the selected display object; when the display object coupling data indicates that the selected display object is coupled to a first viewpoint, the selected display object being presented in the second graphical image using the stored first viewpoint coordinate data so that the selected display object is perceptible as viewed from the first viewpoint; and the processor, in executing the instructions in response to a third signal indicating that transporting the selected display object has been completed, modifies the display object coupling data to indicate that the selected display object is not coupled to the first viewpoint.

37. The improvement in the interactive system of claim 36 wherein the second viewpoint is in a second navigable workspace; the second navigable workspace being represented by a workspace data structure stored in the memory of the interactive system; the second graphical image being a view of the second navigable workspace; and the processor, further in executing the instructions in response to the second signal, modifies the workspace data structure to indicate that the selected display object is included in the second navigable workspace.

38. The improvement in the interactive system of claim 36 wherein the processor, in response to a series of next viewpoint request signals indicating system user requests for viewpoint motion in the workspace received before the third signal is received, presents a respective next graphical image in response to each of the series of next viewpoint request signals; each respective next graphical image being perceptible as viewed from a next viewpoint; when the display object coupling data indicates that the selected display object is coupled to the first viewpoint, the selected display object being presented in each respective next graphical image using the stored first viewpoint coordinate data so that the selected display object is perceptible as being viewed from the first viewpoint.

* * * * *